(12) United States Patent  
Aizenberg et al.

(10) Patent No.: US 12,116,287 B2  
(45) Date of Patent: Oct. 15, 2024

(54) FORMATION OF HIGH QUALITY TITANIA, ALUMINA AND OTHER METAL OXIDE TEMPLATED MATERIALS THROUGH COASSEMBLY

(71) Applicant: President and Fellows of Harvard College, Cambridge, MA (US)

(72) Inventors: Joanna Aizenberg, Cambridge, MA (US); Tanya Shirman, Arlington, MA (US); Katherine Reece Phillips, Cambridge, MA (US); Elijah Shirman, Arlington, MA (US); Theresa Kay, South Stoney Creek (CA)

(73) Assignee: President and Fellows of Harvard College, Cambridge, MA (US)

( * ) Notice: Subject to any disclaimer, the term of this patent is extended or adjusted under 35 U.S.C. 154(b) by 347 days.

(21) Appl. No.: 17/543,494

(22) Filed: Dec. 6, 2021

(65) Prior Publication Data

US 2022/0250935 A1    Aug. 11, 2022

Related U.S. Application Data

(63) Continuation of application No. 16/089,805, filed as application No. PCT/US2017/025721 on Apr. 3, 2017, now Pat. No. 11,192,796.  
(Continued)

(51) Int. Cl.  
*B01J 35/23*    (2024.01)  
*B01D 39/20*    (2006.01)  
(Continued)

(52) U.S. Cl.  
CPC ......... *C01G 25/02* (2013.01); *B01D 39/2027* (2013.01); *B01J 20/06* (2013.01);  
(Continued)

(58) Field of Classification Search  
CPC .......... B01J 35/23; B01J 35/39; B01J 21/063; B82Y 20/00; B82Y 30/00  
(Continued)

(56) References Cited

U.S. PATENT DOCUMENTS 4,746,468 A    5/1988   Ozaki et al.  
6,853,760 B2    2/2005   Sekine et al.  
(Continued)

FOREIGN PATENT DOCUMENTS

EA          016136         2/2012  
JP       2003-121601 A     4/2003  
(Continued)

OTHER PUBLICATIONS

Agrawal et al., "Recent developments in fabrication and applications of colloid based composite particles," J. Mater. Chem., first published Oct. 20, 2010, vol. 21, pp. 615-627.  
(Continued)

*Primary Examiner* — Katherine A Christy  
(74) *Attorney, Agent, or Firm* — Wilmer Cutler Pickering Hale and Dorr LLP

(57) ABSTRACT

Disclosed herein is an inverse photonic structure comprising a first component comprising air holes or colloidal particles; and a metal oxide matrix comprising metal oxide nanocrystals, wherein the metal oxide nanocrystals comprise at least one of: a transition metal, titania, zirconia, alumina, iron oxide, zinc oxide, tin oxide, beryllia, a noble metal oxide, platinum group metal oxides, hafnia, molybdenum oxide, tungsten oxide, rhenium oxide, tantalum oxide, niobium oxide, vanadium oxide, chromium oxide, scandium oxide, yttria, lanthanum oxide, ceria, a rare earth oxide, thorium oxide, uranium oxide, other rare earth oxides, or a combi-  
(Continued)

nation thereof, wherein the inverse photonics structure is crack-free for at least 10,000 repeat units of the first component.

18 Claims, 20 Drawing Sheets

Related U.S. Application Data

(60) Provisional application No. 62/316,772, filed on Apr. 1, 2016.

(51) Int. Cl.
| | |
|---|---|
| B01J 20/06 | (2006.01) |
| B01J 20/08 | (2006.01) |
| B01J 20/28 | (2006.01) |
| B01J 20/30 | (2006.01) |
| B01J 21/04 | (2006.01) |
| B01J 21/06 | (2006.01) |
| B01J 35/39 | (2024.01) |
| B01J 37/02 | (2006.01) |
| B01J 37/04 | (2006.01) |
| B82Y 30/00 | (2011.01) |
| C01F 7/02 | (2022.01) |
| C01G 23/047 | (2006.01) |
| C01G 23/053 | (2006.01) |
| C01G 25/02 | (2006.01) |
| C09D 17/00 | (2006.01) |
| F02N 11/08 | (2006.01) |
| H01M 4/48 | (2010.01) |
| H01M 4/90 | (2006.01) |
| B82Y 20/00 | (2011.01) |
| B82Y 40/00 | (2011.01) |

(52) U.S. Cl.
CPC ......... *B01J 20/08* (2013.01); *B01J 20/28007* (2013.01); *B01J 20/3085* (2013.01); *B01J 21/04* (2013.01); *B01J 21/063* (2013.01); *B01J 21/066* (2013.01); *B01J 35/23* (2024.01); *B01J 35/39* (2024.01); *B01J 37/0215* (2013.01); *B01J 37/04* (2013.01); *C01F 7/02* (2013.01); *C01G 23/047* (2013.01); *C01G 23/053* (2013.01); *C09D 17/007* (2013.01); *C09D 17/008* (2013.01); *F02N 11/08* (2013.01); *H01M 4/48* (2013.01); *H01M 4/9016* (2013.01); *B82Y 20/00* (2013.01); *B82Y 30/00* (2013.01); *B82Y 40/00* (2013.01); *C01P 2002/02* (2013.01); *C01P 2002/60* (2013.01); *C01P 2002/72* (2013.01); *C01P 2002/82* (2013.01); *C01P 2002/85* (2013.01); *C01P 2004/02* (2013.01); *C01P 2004/03* (2013.01); *C01P 2004/04* (2013.01); *C01P 2006/60* (2013.01)

(58) Field of Classification Search
USPC ...................................................... 428/613
See application file for complete search history.

(56) References Cited

U.S. PATENT DOCUMENTS

| 7,373,073 | B2 | 5/2008 | Kamp et al. |
|---|---|---|---|
| 7,700,520 | B2 | 4/2010 | Chien et al. |
| 8,334,014 | B1 | 12/2012 | Petsev et al. |
| 8,389,388 | B2 | 3/2013 | Cho et al. |
| 8,835,003 | B2 | 9/2014 | Chen et al. |
| 8,936,683 | B2 | 1/2015 | Marshall |
| 8,974,993 | B2 | 3/2015 | Richards-Johnson et al. |
| 9,279,771 | B2 | 3/2016 | Aizenberg et al. |
| 2001/0026659 | A1 | 10/2001 | Sekine et al. |
| 2003/0091647 | A1 | 5/2003 | Lewis et al. |
| 2003/0162004 | A1 | 8/2003 | Mirkin et al. |
| 2005/0166837 | A1 | 8/2005 | Marshall |
| 2006/0120683 | A1 | 6/2006 | Kamp et al. |
| 2009/0072222 | A1 | 3/2009 | Radisic et al. |
| 2009/0242839 | A1 | 10/2009 | Winkler et al. |
| 2011/0194304 | A1 | 8/2011 | Han et al. |
| 2011/0311635 | A1 | 12/2011 | Stucky et al. |
| 2011/0312080 | A1 | 12/2011 | Hatton et al. |
| 2012/0032168 | A1 | 2/2012 | Cho et al. |
| 2012/0121820 | A1 | 5/2012 | Kaplan et al. |
| 2012/0238442 | A1 | 9/2012 | Lee |
| 2012/0326104 | A1 | 12/2012 | Kwon et al. |
| 2013/0337257 | A1 | 12/2013 | Yano et al. |
| 2014/0197364 | A1 | 7/2014 | Richards-Johnson et al. |
| 2014/0254017 | A1 | 9/2014 | Manoharan et al. |
| 2016/0144350 | A1 | 5/2016 | Aizenberg et al. |

FOREIGN PATENT DOCUMENTS

| KR | 2011-0117138 A | 10/2011 |
|---|---|---|
| WO | WO-2009/148082 A1 | 12/2009 |
| WO | WO-2012/078351 A2 | 6/2012 |
| WO | WO-2014/210608 A1 | 12/2014 |
| WO | WO-2015/017722 A | 2/2015 |
| WO | WO-2017/173306 A1 | 10/2017 |
| WO | WO-2017/173439 A2 | 10/2017 |

OTHER PUBLICATIONS

Albrecht et al., "Thermal conductivity of opals and related composites," Physical Review B, Mar. 2001, vol. 63, p. 134303-1 to 134303-8.

An et al., "Nanocatalysis I: Synthesis of Metal and Bimetallic Nanoparticles and Porous Oxides and Their Catalytic Reaction Studies", Catal. Lett., 2015, vol. 145, pp. 233-248.

Anderson et al., "Nanoparticle conversion chemistry: Kirkendall effect, galvanic exchange, and anion exchange", Nanoscale, Nov. 7, 2014, vol. 6, No. 21, pp. 12195-12216.

Aprile et al., "Enhancement of the photocatalytic activity of TiO2 through spatial structuring and particle size control: from subnanometric to submillimetric length scale," Physical Chemistry Chemical Physics, Feb. 14, 2008, vol. 10, pp. 769-783.

Argyle et al., "Heterogeneous Catalyst Deactivation and Regeneration: A Review", Catalysts, Feb. 26, 2015, vol. 5, pp. 145-269.

Armstrong et al., "Artificial opal photonic crystals and inverse opal structures—fundamentals and applications from optics to energy storage," Journal of Materials Chemistry C, May 20, 2015, vol. 3, pp. 6109-6143.

Bacci et al., "Non-destructive spectroscopic detection of cobalt(II) in paintings and glass", Studies in Conservation, 1996, vol. 41, No. 3, pp. 136-144.

Biener et al., "Nanoporous Plasmonic Metamaterials," Adv. Mater. 20:1211-1217, 2008.

Biesinger et al., "Resolving surface chemical states in XPS analysis of first row transition metals, oxides and hydroxides: Cr, Mn, Fe, Co and Ni," Applied Surface Science, published online Oct. 20, 2010, vol. 257, pp. 2717-2730.

Boal et al., "Self-assembly of nanoparticles into structured spherical and network aggregates," Nature, Apr. 13, 2000, vol. 404, pp. 746-748.

Boualleg et al., "Selective and regular localization of accessible Pt nanoparticles inside the walls of an ordered silica: Application as a highly active and well-defined heterogeneous catalyst for propene and styrene hydrogenation reactions," Journal of Catalysis, available online Oct. 26, 2021, vol. 284, pp. 184-193.

Burgess et al., "Wetting in Color: Colorimetric Differentiation of Organic Liquids with High Selectivity," ACS Nano (2012), published online Dec. 20, 2011, vol. 6, pp. 1427-1437.

Cai et al., "Two-Dimensional Photonic Crystal Chemical and Biomolecular Sensors," Analytical Chemistry, Apr. 13, 2015, vol. 87, pp. 5013-5025.

(56) References Cited

OTHER PUBLICATIONS

Campbell, "The Energetics of Supported Metal Nanoparticles: Relationships to Sintering Rates and Catalytic Activity," Accounts of Chemical Research, published online Apr. 22, 2013, vol. 46, pp. 1712-1719.
Cao et al., "Stabilizing metal nanoparticles for heterogeneous catalysis", Physical Chemistry Chemical Physics, 2010, vol. 12, pp. 13499-13510.
Caruso, "Nanoengineering of Particle Surfaces", Advanced Materials, Jan. 5, 2001, vol. 13, No. 1, pp. 11-22.
Chave et al., "Sonochemical deposition of platinum nanoparticles on polymer beads and their transfer on the pore surface of a silica matrix," Journal of Colloid and Interface Science, available online Dec. 27, 2012, vol. 395, pp. 81-84.
Chemseddine et al., "Nanostructuring Titania: Control over Nanocrystal Structure, Size, Shape, and Organization," Eur. J. Inorg. Chem, Jan. 18, 1999, vol. 1999, Issue 2, pp. 235-245.
Chen et al., "A novel green synthesis approach for polymer nanocomposites decorated with silver nanoparticles and their antibacterial activity," Analyst, Nov. 21, 2014, vol. 139, pp. 5793-5799.
Chen et al., "Creating dynamic SERS hotspots on the surface of pH-responsive microgels for direct detection of crystal violet in solution," RSC Advances, Jun. 27, 2017, vol. 7, pp. 32743-32748.
Chen et al., "Effect of Disorder on the Optically Amplified Photocatalytic Efficiency of Titania Inverse Opals," J. Am. Chem. Soc. Jan. 12, 2007, vol. 129, pp. 1196-1202.
Chen et al., "Heterogeneous photocatalysis with inverse titania opals: probing structural and photonic effects," Journal of Materials Chemistry, first published online Mar. 17, 2009, vol. 19, pp. 2675-2678.
Cherdhirankorn et al., "Tracer Diffusion in Silica Inverse Opals," Langmuir, published online Mar. 16, 2010, vol. 26, pp. 10141-10146.
Climent et al., "Heterogeneous Catalysis for Tandem Reactions," ACS Catalysis, Jan. 23, 2014, vol. 4, pp. 870-891.
Corma et al., "Supported gold nanoparticles as catalysts for organic reactions", Chemical Society Reviews, 2008, vol. 37, pp. 2096-2126.
Costa et al., "Synthesis of supported metal nanoparticle catalysts using ligand assisted methods," Nanoscale, Aug. 23, 2012, vol. 4, pp. 5826-5834.
Cozzoli et al., "Low-Temperature Synthesis of Soluble and Processable Organic-Capped Anatase TiO2 Nanorods," J. Am. Chem. Soc., Oct. 31, 2003, vol. 125, pp. 14539-14548.
Das et al., "Microgels Loaded with Gold Nanorods: Photothermally Triggered Volume Transitions under Physiological Conditions", Langmuir, 2007, vol. 23, No. 1, pp. 196-201.
Diao et al., "Multiple Structural Coloring of Silk-Fibroin Photonic Crystals and Humidity-Responsive Color Sensing", Advanced Functional Materials, 2013, vol. 23, pp. 5373-5380.
Dick et al., "Size-Dependent Melting of Silica-Encapsulated Gold Nanoparticles", Journal of American Chemical Society, 2002, vol. 124, No. 10, pp. 2312-2317.
Dong et al., "Superhydrophobic polysilsesquioxane/polystyrene microspheres with controllable morphology: from raspberry-like to flower-like structure", RSC Advances, 2017, vol. 7, pp. 6685-6690.
Du et al., "Facile Fabrication of Raspberry-like Composite Nanoparticles and Their Application as Building Blocks for Constructing Superhydrophilic Coatings," The Journal of Physical Chemistry C, May 28, 2009, vol. 113, p. 9063-9070.
Dziomkina et al., "Colloidal crystal assembly on topologically patterned templates," Soft Matter, vol. 1, pp. 265-279, Sep. 12, 2005.
El Baydi et al., "A Sol-Gel Route for the Preparation of Co3O4 Catalyst for Oxygen Electrocatalysis in Alkaline Medium," Journal of Solid State Chemistry, Apr. 1994, vol. 109, p. 281-288.
Ennaert et al., "Potential and challenges of zeolite chemistry in the catalytic conversion of biomass," Chem. Soc. Rev., first published Dec. 21, 2015, vol. 45, pp. 584-611.
Erola et al., "Fabrication of Au—and Ag—SiO2 inverse opals having both localized surface plasmon resonance and Bragg diffraction," Journal of Solid State Chemistry, Oct. 2015, vol. 230, pp. 209-217.
Esposito et al., "Cobalt-silicon mixed oxide nanocomposites by modified sol-gel method," Journal of Solid State Chemistry, Oct. 2007, vol. 180, pp. 3341-3350.
European Extended Search Report mailed Jun. 23, 2020, in the European Application No. 20150420.6. 12 pages.
European extended search report mailed Jun. 7, 2021, in European application No. 18861253.5. 10 pages.
European Extended Search Report mailed Nov. 14, 2019, in the European Application No. 17776797.7, 9 pages.
Fechete et al., "The past, present and future of heterogeneous catalysis," Catalysis Today, published online May 10, 2012, vol. 189, pp. 2-27.
Feinle et al., "Sol-gel synthesis of monolithic materials with hierarchical porosity," Chemical Society Reviews (2016), first published Nov. 13, 2015, vol. 45, pp. 3377-3399.
Ferrando et al., "Nanoalloys: From Theory to Applications of Alloy Clusters and Nanoparticles", Chemical Reviews, 2008, vol. 108, No. 3, pp. 845-910.
Fetterolf et al., "Adsorption of Methylene Blue and Acid Blue 40 on Titania from Aqueous Solution," Journal of Chemical & Engineering Data, Apr. 29, 2003, vol. 48, pp. 831-835.
Francesco et al., "Synergy in the Catalytic Activity of Bimetallic Nanoparticles and New Synthetic Methods for the Preparation of Fine Chemicals", ChemCatChem Minireviews, published online Aug. 19, 2014, vol. 6, pp. 2784-2791.
Fuhrmann et al., "Diatoms as living photonic crystals," Applied Physics B, Feb. 2004, vol. 78, pp. 257-260.
Gao et al., "Stimuli-responsive microgel-based etalons for optical sensing", RSC Advances, 2015. vol. 5, pp. 44074-44087.
Garcia et al., "Photonic crystals with controlled disorder," Physical Review A, Aug. 10, 2011, vol. 84, pp. 023813-1 to 023813-7.
Garcia et al., "Photonic Glass: A Novel Random Material for Light," Advanced Materials, Aug. 9, 2007, vol. 19, pp. 2597-2602.
Garcia et al., "Photonic Glasses: A Step Beyond White Paint," Advanced Materials, published online Aug. 3, 2009, vol. 22, pp. 12-19.
Girardon et al., "Effect of cobalt precursor and pretreatment conditions on the structure and catalytic performance of cobalt silica-supported Fischer-Tropsch catalysts," Journal of Catalysis, Mar. 10, 2005, vol. 230, pp. 339-352.
Goncalves et al., "Photoluminescence in Er3+/Yb3+-doped silica-titania inverse opal structures," Journal of Sol-Gel Science and Technology, vol. 55, No. 1, pp. 52-58, published online Apr. 29, 2010.
Gonzalez-Delgado, et al. "Control of the Lateral Organization in Langmuir Monolayers via Molecular Aggregation of Dyes," The Journal of Physical Chemistry C, Oct. 7, 2010, vol. 114, pp. 16685-16695.
Govorov et al., "Gold nanoparticle ensembles as heaters and actuators: melting and collective plasmon resonances," Nanoscale Research Letters, Jul. 26, 2006, vol. 1, pp. 84-90.
Grabar et al., "Two-Dimensional Arrays of Colloidal Gold Particles: A Flexible Approach to Macroscopic Metal Surfaces," Langmuir, May 15, 1996, vol. 12, pp. 2353-2361.
Griffete et al., "Inverse Opals of Molecularly Imprinted Hydrogels for the Detection of Bisphenol A and pH Sensing", Langmuir, Nov. 16, 2011, vol. 28, pp. 1005-1012.
Guerrero-Martinez et al., "Recent Progress on Silica Coating of Nanoparticles and Related Nanomaterials," Advanced Materials, Jan. 4, 2010, vol. 22, pp. 1182-1195.
Hague et al., "Controlling Crystallinity during Processing of Nanocrystalline Titania," J. Am. Ceram. Soc., Jul. 1994, vol. 77, No. 7, pp. 1957-1960.
Hall et al., "Mesostructure-Induced Selectivity in $CO_2$ Reduction Catalysis", Journal of the American Chemical Society, Nov. 4, 2015, vol. 137, pp. 14834-14837.

(56) References Cited

OTHER PUBLICATIONS

Han et al., "Selective oxidation of methanol to methyl formate on catalysts of Au—Ag alloy nanoparticles supported on titania under UV irradiation," Green Chemistry, May 19, 2014, vol. 16, pp. 3603-3615.

Hansen et al., "Sintering of Catalytic Nanoparticles: Particle Migration or Ostwald Ripening?", Accounts of Chemical Research, 2013, vol. 46, No. 8, pp. 1720-1730.

Hartmann, et al., "Catalytic test reactions for the evaluation of hierarchical zeolites," Chem. Soc. Rev. Mar. 17, 2016, vol. 45, pp. 3313-3330.

Hatton et al., "Assembly of large-area, highly ordered, crack-free inverse opal films", Proceedings of the National Academy of Sciences, vol. 107, No. 23, pp. 10354-10359, Jun. 8, 2010.

He et al., "Chemo-Mechanically Regulated Oscillation of an Enzymatic Reaction," Chemistry of Materials, Feb. 3, 2013, vol. 25, pp. 521-523.

Heveling, "Heterogeneous Catalytic Chemistry by Example of Industrial Applications", Journal of Chemical Education, Oct. 9, 2012, vol. 89, pp. 1530-1536.

Hou et al., "A Review of Surface Plasmon Resonance-Enhanced Photocatalysis," Advanced Functional Materials, Oct. 30, 2013, vol. 23, pp. 1612-1619.

Hou et al., "Bioinspired molecular co-catalysts bonded to a silicon photocathode for solar hydrogen evolution," Nature Materials, Jun. 2011, vol. 10, pp. 434-438.

Huang et al., "High-performance heterogeneous catalysis with surface-exposed stable metal nanoparticles", Scientific Reports, Nov. 27, 2014, vol. 4, p. 7228 (8 pages).

Huang et al., "Self-Assembly of Multi-nanozymes to Mimic an Intracellular Antioxidant Defense System," Angew. Chem. Int. Ed. Engl., Apr. 21, 2016, vol. 55, pp. 6646-6650.

Hunt et al., "Elemental Sustainability for Catalysis," Chapter 1 from: Sustainable Catalysis: With Non-endangered Metals, Part 1, Royal Society of Chemistry, Nov. 16, 2015, pp. 1-14.

Ibisate et al., "Silicon Direct Opals," Advanced Materials, May 7, 2009, vol. 21, pp. 2899-2902.

Iglesia, "Design, synthesis, and use of cobalt-based Fischer-Tropsch synthesis catalysts," Applied Catalysis A: General, Nov. 4, 1997, vol. 161, pp. 59-78.

International Search Report and Written Opinion mailed Feb. 5, 2019, in the International Application No. PCT/US18/53822, 20 pages.

International Search Report and Written Opinion mailed Jun. 20, 2017, in the International Application: PCT/US2017/025437, filed Mar. 31, 2017, 17 pages.

International Search Report and Written Opinion mailed May 8, 2018 in International Application No. PCT/US17/25721, filed Apr. 3, 2017, 14 pages.

International Search Report and Written Opinion mailed Oct. 30, 2014 in the International Application No. PCT/US2014/044939, filed Jun. 30, 2014, 14 pages.

Jarosz et al., "Heat Treatment Effect on Crystalline Structure and Photoelectrochemical Properties of Anodic $TiO_2$ Nanotube Arrays Formed in Ethylene Glycol and Glycerol Based Electrolytes", J. Phys. Chem. C, Oct. 5, 2015, vol. 119, pp. 24182-24191.

Jellinek, "Nanoalloys: tuning properties and characteristics through size and composition", Faraday Discussions, 2008, vol. 138, pp. 11-35.

Karg et al., "Nanorod-Coated PNIPAM Microgels: Thermoresponsive Optical Properties", Small, 2007, vol. 3, No. 7, pp. 1222-1229.

Keita et al., "Synthesis of remarkably stabilized metal nanostructures using polyoxometalates", Journal of Materials Chemistry, 2009, vol. 19, pp. 19-33.

Kessler et al., "New insight in the role of modifying ligands in the sol-gel processing of metal alkoxide precursors: A possibility to approach new classes of materials", J. Sol-Gel Sci Techn, 2006, vol. 40, pp. 163-179.

Khodakov et al., "Advances in the Development of Novel Cobalt Fischer-Tropsch Catalysts for Synthesis of Long-Chain Hydrocarbons and Clean Fuels," Chemical Reviews, May 9, 2007, vol. 107, pp. 1692-1744.

Kim et al., "Silk protein based hybrid photonic-plasmonic crystal," Optics Express, published Apr. 3, 2013, vol. 21, pp. 8897-8903.

Koay et al., "Hierarchical structural control of visual properties in self-assembled photonic-plasmonic pigments", Optics Express, Nov. 3, 2014, vol. 22, No. 23, pp. 27750-27768.

Laczka et al., "Chromium, cobalt, nickel and copper as pigments of sol-gel glasses," Journal of Alloys and Compounds, Feb. 15, 1995, vol. 218, pp. 77-85.

Lange, "Renewable Feedstocks: The Problem of Catalyst Deactivation and its Mitigation," Angew. Chem. Int. Ed. Engl., Oct. 12, 2015, vol. 54, 13186-13197.

Le Beulze et al., "Robust raspberry-like metallo-dielectric nanoclusters of critical sizes as SERS substrates," Nanoscale, Apr. 11, 2017, vol. 9, pp. 5725-5736.

Lee et al., "Facile fabrication of sub-100 nm mesoscale inverse opal films and their application in dye-sensitized solar cell electrodes," Scientific Reports, Oct. 28, 2014, vol. 4: 6804, 7 pages.

Lee et al., "Monolayer $Co_3O_4$ Inverse Opals as Multifunctional Sensors for Volatile Organic Compounds", Chemistry—A European Journal, published online Apr. 29, 2016, vol. 22, pp. 7102-7107.

Lee et al., "Rapid Hydrolysis of Organophosphorous Esters Induced by Nanostructured, Fluorine-Doped Titania Replicas of Diatom Frustules," Journal of the American Ceramic Society, May 10, 2007, vol. 90, pp. 1632-1636.

Li et al. "Improved electrochromic performance in inverse opal vanadium oxide films," Journal of Materials Chemistry, Jul. 22, 2010, vol. 20, pp. 7131-7134.

Li et al. "The forces at work in colloidal self-assembly: a review on fundamental interactions between colloidal particles," Asia-Pacific Journal of Chemical Engineering, Jul. 17, 2008, vol. 3, pp. 255-268.

Li et al., "Colloidal Assembly: The Road from Particles to Colloidal Molecules and Crystals," Angew. Chem. Int. Ed. Engl. Jan. 10, 2011, vol. 50, pp. 360-388.

Li et al., "Crack-free 2D-inverse opal anatase TiO2 films on rigid and flexible transparent conducting substrates: low temperature large area fabrication and electrochromic properties," Journal of Materials Chemistry C, Jul. 23, 2014, vol. 2, Issue 37, pp. 7804-7810.

Li et al., "Facile and Controlled Fabrication of Functional Gold Nanoparticle-coated Polystyrene Composite Particle," Macromolecular Rapid Communications, Nov. 1, 2011, vol. 32, pp. 1741-1747.

Li et al., "Silica-supported Au—Cu alloy nanoparticles as an efficient catalyst for selective oxidation of alcohols," Applied Catalysis A: General May 19, 2012, vol. 433-434, pp. 146-151.

Linic, et al., "Plasmonic-metal nanostructures for efficient conversion of solar to chemical energy," Nature Materials, published online Nov. 23, 2011, vol. 10, p. 911-921.

Liu et al., "A new type of raspberry-like polymer composite sub-microspheres with tunable gold nanoparticles coverage and their enhanced catalytic properties," J. Mater. Chem. A, Oct. 30, 2013, vol. 1, pp. 930-937.

Liu et al., "From Galvanic to Anti-Galvanic Synthesis of Bimetallic Nanoparticles and Applications in Catalysis, Sensing, and Materials Science," Advanced Materials, Jan. 27, 2017, vol. 29, 16 pages.

Liu et al., "Slow Photons for Photocatalysis and Photovoltaics", Advanced Materials, 2017, vol. 29, p. 1605349 (21 pages).

Livage et al., "Sol-Gel Chemistry of Transition Metal Oxides", Prog. Solid St. Chem., 1988, vol. 18, pp. 259-341.

Long, et al., "Oxidative etching for controlled synthesis of metal nanocrystals: atomic addition and subtraction," Chem. Soc. Rev., Sep. 7, 2014, vol. 43, pp. 6288-6310.

Lu et al., "Atomic layer deposition—Sequential self-limiting surface reactions for advanced catalyst "bottom-up" synthesis," Surface Science Reports, Jun. 2016, vol. 71, pp. 410-472.

Lytle et al., "Multistep, Low-Temperature Pseudomorphic Transformations of Nanostructured Silica to Titania via a Titanium Oxyfluoride Intermediate", Chem. Mater., 2004, vol. 16, No. 20, pp. 3829-3837.

(56) References Cited

OTHER PUBLICATIONS

Ma et al., "Transition metal-doped titania inverse opals: Fabrication and characterization," Colloids and Surfaces A: Physicochemical and Engineering Aspects (2010), vol. 370, pp. 129-135.
Mason, "The Electronic Spectroscopy of Dyes," Journal of the Society of Dyers and Colourists, Dec. 1968, vol. 84, pp. 604-612.
Ming et al., "Superhydrophobic Films from Raspberry-like Particles", Nano Letters, Oct. 1, 2005, vol. 5, No. 11, pp. 2298-2301.
Mohammadi et al., "Nanomaterials engineering for drug delivery: a hybridization approach," Journal of Materials Chemistry B, May 23, 2017, vol. 5, pp. 3995-4018.
Molenbroek et al., "Alloying in Cu/Pd Nanoparticle Catalysts," The Journal of Physical Chemistry B, Dec. 3, 1998, vol. 102, pp. 10680-10689.
Moon et al., "Chemical transformations of nanostructured materials," Nano Today, Apr. 2011, vol. 6, pp. 186-203.
Munnik et al., "Recent Developments in the Synthesis of Supported Catalysts," Chem. Rev., Jun. 19, 2015, vol. 115, pp. 6687-6718.
Newton et al., "Anisotropic Diffusion in Face-Centered Cubic Opals," Nano Letters, Apr. 10, 2004, vol. 4, pp. 875-880.
Nguyen et al., "Looking for Synergies in Molecular Plasmonics through Hybrid Thermoresponsive Nanostructures", Chemistry of Materials, May 10, 2016, vol. 28, pp. 3564-3577.
Oldenburg et al., "Nanoengineering of optical resonances", Chemical Physics Letters, May 22, 1998, vol. 288, pp. 243-247.
Olguin et al., "Tailoring the oxidation state of cobalt through halide functionality in sol-gel silica," Scientific Reports, Aug. 15, 2013, vol. 3: 2449, 5 pages.
Parlett et al., "Spatially orthogonal chemical functionalization of a hierarchical pore network for catalytic cascade reactions", Nature Materials, Feb. 2016, vol. 15, pp. 178-182 (7 pages).
Personick et al., "Catalyst design for enhanced sustainability through fundamental surface chemistry," Philos. Trans. A Math. Phys. Eng. Sci., Feb. 28, 2016, vol. 374, 24 pages.
Personick et al., "Ozone-Activated Nanoporous Gold: A Stable and Storable Material for Catalytic Oxidation," ACS Catalysis, May 28, 2015, vol. 5, pp. 4237-4241.
Phillips et al., "Tunable Anisotropy in Inverse Opals and Emerging Optical Properties," Chemistry of Materials, Jan. 28, 2014, vol. 26, pp. 1622-1628.
Prati et al., "The Art of Manufacturing Gold Catalysts," Catalysts, Dec. 21, 2011, vol. 2, pp. 24-37.
Qian et al., "A novel approach to raspberry-like particles for superhydrophobic materials," Journal of Materials Chemistry, Jan. 22, 2009, vol. 19, pp. 1297-1304.
Qian et al., "Raspberry-like Metamolecules Exhibiting Strong Magnetic Resonances," ACS Nano, Jan. 26, 2015, vol. 9, pp. 1263-1270.
Regonini et al., "Effect of heat treatment on the properties and structure of TiO2 nanotubes: phase composition and chemical composition," Surface and Interface Analysis, Mar. 2010, vol. 42, pp. 139-144.
Reisfeld et al., "Irreversible Spectral Changes of Cobalt(II) by Moderate Heating in Sol-Gel Glasses, and their Ligand Field Rationalization", Chemical Physics Letters, Dec. 8, 1989, vol. 164, No. 2,3, pp. 307-312.
Ren et al., "Ordered mesoporous metal oxides: synthesis and applications," Chem. Soc. Rev., May 31, 2012, vol. 41, pp. 4909-4927.
Richman et al., "Ordered Mesoporous Silicon through Magnesium Reduction of Polymer Templated Silica Thin Films," Nano Letters, Aug. 15, 2008, vol. 8, pp. 3075-3079.
Ryu et al., "Fabrication of Ag nanoparticles-coated macroporous $SiO_2$ structure by using polystyrene spheres," Materials Chemistry and Physics, vol. 101, No. 2-3, pp. 486-491, Jan. 26, 2007.
Sachse et al., "Surfactant-Templating of Zeolites: From Design to Application", Chemistry of Materials, Apr. 4, 2017, vol. 29, pp. 3827-3853.
Saib et al., "Silica supported cobalt Fischer-Tropsch catalysts: effect of pore diameter of support," Catalysis Today, Jan. 15, 2002, vol. 71, pp. 395-402.
Sanchez et al., "Biomimetism and bioinspiration as tools for the design of innovative materials and systems," Nature Materials, Apr. 2005, vol. 4, pp. 277-288.
Sandhage et al., "Merging Biological Self-Assembly with Synthetic Chemical Tailoring: The Potential for 3-D Genetically Engineered Micro/Nano-Devices (3-D GEMS)", International Journal of Applied Ceramic Technology, 2005, vol. 2, No. 4, pp. 317-326.
Sandhage et al., "Novel, Bioclastic Route to Self-Assembled, 3D, Chemically Tailored Meso/Nanostructures: Shape-Preserving Reactive Conversion of Biosilica (Diatom) Microshells", Advanced Materials, Mar. 18, 2002, vol. 14, No. 6, pp. 429-433.
Sandhage, "Materials "Alchemy": Shape-Preserving Chemical Transformation of Micro-to-Macroscopic 3-D Structures", JOM, Jun. 2010, vol. 62, No. 6, pp. 32-43.
Sankar et al., "Designing bimetallic catalysts for a green and sustainable future," Chem. Soc. Rev. Oct. 23, 2012, vol. 41, pp. 8099-8139.
Schauermann et al., "Nanoparticles for Heterogeneous Catalysis: New Mechanistic Insights", Accounts of Chemical Research, 2013, vol. 46, No. 8, pp. 1673-1681.
Schneider et al., "Understanding $TiO_2$ Photocatalysis: Mechanisms and Materials," Chemical Reviews, Sep. 19, 2014, vol. 114, pp. 9919-9986.
Schultz et al., "From Molecular Diversity to Catalysis: Lessons from the Immune System," Science, Sep. 29, 1995, vol. 269, pp. 1835-1842.
Schwieger et al., "Hierarchy concepts: classification and preparation strategies for zeolite containing materials with hierarchical porosity", Chem. Soc. Rev., Jun. 21, 2016, vol. 45, pp. 3353-3376.
Serp et al,. "Chemical Vapor Deposition Methods for the Controlled Preparation of Supported Catalytic Materials," Chemical Reviews, Aug. 3, 2002, vol. 102, pp. 3085-3128.
Shastri et al., "An aptamer-functionalized chemomechanically modulated biomolecule catch-and-release system," Nature Chemistry, published online Mar. 23, 2015, DOI: 10.1038/NCHEM.2203. 8 pages.
Shepherd et al., "Stop-Flow Lithography of Colloidal, Glass, and Silicon Microcomponents", Advanced Materials, 2008, vol. 20, pp. 4734-4739.
Shi et al., "Amorphous Photonic Crystals with Only Short-Range Order," Advanced Materials, Jun. 20, 2013, vol. 25, pp. 5314-5320.
Shi et al., "Gold Nanoshells on Polystyrene Cores for Control of Surface Plasmon Resonance," Langmuir Jan. 15, 2005, vol. 21, pp. 1610-1617.
Shi et al., "Recent advances of pore system construction in zeolite-catalyzed chemical industry processes," Chem. Soc. Rev., Nov. 16, 2015, vol. 44, pp. 8877-8903.
Shi et al., "Recent progress on upgrading of bio-oil to hydrocarbons over metal/zeolite bifunctional catalysts," Catalysis Science & Technology, May 3, 2017, vol. 7, 2385-2415.
Shirman et al., "New Architectures for Designated Catalysts: Selective Oxidation using AgAu Nanoparticles on Colloid-Templated Silica", Chemistry—A European Journal, 2018, vol. 24, pp. 1833-1837.
Singh et al., "Synergistic Catalysis over Bimetallic Alloy Nanoparticles", ChemCatChem Reviews, 2013, vol. 5, pp. 652-676.
Singleton et al., "Photo-tuning of highly selective wetting in inverse opals," Soft Matter, Mar. 7, 2014, vol. 10, Issue 9, pp. 1325-1328.
Sofo et al., "Diffusion and transport coefficients in synthetic opals," Physical Review B, Jul. 15, 2000, vol. 62, pp. 2780-2785.
Stein et al., "Design and functionality of colloidal-crystal-templated materials—chemical applications of inverse opals," Chem. Soc. Rev. Apr. 7, 2013, vol. 42, pp. 2763-2803.
Stein et al., "Morphological Control in Colloidal Crystal Templating of Inverse Opals, Hierarchical Structures, and Shaped Particles," Chemistry of Materials, vol. 20, No. 3, pp. 649-666, Feb. 1, 2008.
Subramania et al., "Optical Photonic Crystals Synthesized from Colloidal Systems of Polystyrene Spheres and Nanocrystalline Titania," Journal of Lightwave Technology, Nov. 1999, vol. 17, No. 11, pp. 1970-1974.
Surnev et al., "Structure-Property Relationship and Chemical Aspects of Oxide-Metal Hybrid Nanostructures", Chemical Reviews, Dec. 13, 2012, vol. 113, pp. 4314-4372.

(56) References Cited

OTHER PUBLICATIONS

Sutton et al., "Photothermally triggered actuation of hybrid materials as a new platform for in vitro cell manipulation," Nature Communications, Mar. 13, 2017, vol. 8, No. 14700, 13 pages.
Takeoka, "Stimuli-responsive opals: colloidal crystals and colloidal amorphous arrays for use in functional structurally colored materials", J. Mater. Chem. C, Oct. 14, 2013, vol. 1, No. 38, pp. 6059-6074.
Telford et al., "Mimicking the Wettability of the Rose Petal using Self-assembly of Waterborne Polymer Particles", Chemistry of Materials, Jul. 23, 2013, vol. 25, pp. 3472-3479.
Tian et al., "Design of Raspberry-Shaped Microcarriers with Adjustable Protrusions and Functional Groups for the Improvement of Lipase Immobilization and Biocatalysis: Environmentally Friendly Esterification of Oleic Acid for Biodiesel," ChemCatChem, (2016) vol. 8, p. 2576.
Tian et al., "Monodisperse raspberry-like multihollow polymer/Ag nanocomposite microspheres for rapid catalytic degradation of methylene blue", Journal of Colloid and Interface Science, 2017, vol. 491, pp. 294-304.
Trogadas et al., "Nature-inspired optimization of hierarchical porous media for catalytic and separation processes", New J. Chem., 2016, vol. 40, pp. 4016-4026.
Turkevich et al., "A Study of the Nucleation and Growth Processes in the Synthesis of Colloidal Gold," Discussions of the Faraday Society, Jan. 1951, 11, pp. 55-75.
Tétreault et al., "High-Efficiency Dye-Sensitized Solar Cell with Three-Dimensional Photoanode", Nano Letters, Sep. 30, 2011, vol. 11, pp. 4579-4584.
Vasquez et al., "Three-Phase Co-assembly: In Situ Incorporation of Nanoparticles into Tunable, Highly Ordered, Porous Silica Films," ACS Photonics, published online Nov. 1, 2013, vol. 1, pp. 53-60.
Vlasov et al., "Different regimes of light localization in a disordered photonic crystal," Physical Review B, Jul. 15, 1999, vol. 60, pp. 1555-1562.
Vogel et al., "Color from hierarchy: Diverse optical properties of micron-sized spherical colloidal assemblies," PNAS, Sep. 1, 2015, vol. 112, pp. 10845-10850.
Vogel et al., "Wafer-Scale Fabrication of Ordered Binary Colloidal Monolayers with Adjustable Stoichiometries," Advanced Functional Materials, vol. 21, Issue 6, published online Jun. 14, 2011, pp. 3064-3073.
Wang et al., "New Polymer Colloidal and Carbon Nanospheres: Stabilizing Ultrasmall Metal Nanoparticles for Solvent-Free Catalysis", Chemistry of Materials, Apr. 18, 2017, vol. 29, pp. 4044-4051.
Xia et al., "Freestanding $Co_3O_4$ nanowire array for high performance supercapacitors," RSC Advances Jan. 4, 2012, vol. 2, pp. 1835-1841.
Xie, et al., "Temperature-Controlled Diffusion in PNIPAM-Modified Silica Inverse Opals," ACS Macro Letters, Jan. 15, 2016, vol. 5, pp. 190-194.
Xu et al., "Composite Microspheres for Separation of Plasmid DNA Decorated with MNPs through in Situ Growth or Interfacial Immobilization Followed by Silica Coating," ACS Applied Materials and Interfaces, Sep. 5, 2012, vol. 4, pp. 4764-4775.
Yang et al., "Hierarchical $TiO_2$ photonic crystal spheres prepared by spray drying for highly efficient photocatalysis", Journal of Materials Chemistry A, 2013, vol. 1, pp. 541-547.
Yang et al., "Synthesis of replica mesostructures by the nanocasting strategy" Journal of Materials Chemistry, 2005, vol. 15, pp. 1217-1231.
Yetisen et al., "Photonic hydrogel sensors," Biotechnology Advances, May-Jun. 2016, vol. 34, pp. 250-271.
Yoon et al., "Multifunctional polymer particles with distinct compartments", Journal of Materials Chemistry, 2011, vol. 21, pp. 8502-8510.
Yoon et al., "Tuning of Silver Catalyst Mesostructure Promotes Selective Carbon Dioxide Conversion into Fuels," Angewandte Chemie, published online Nov. 10, 2016, vol. 128, pp. 15508-15512.
Zhang et al., "Reprogrammable Logic Gate and Logic Circuit Based on Multistimuli-Responsive Raspberry-like Micromotors," ACS Applied Materials & Interfaces, May 30, 2016, vol. 8, 15654-15660.
Zhang et al., "Size and composition tunable Ag—Au alloy nanoparticles by replacement reactions", Nanotechnology, May 18, 2007, vol. 18, p. 245605 (9 pages).
Zhang, et al. "Enhanced electrochromic performance of highly ordered, macroporous WO3 arrays electrodeposited using polystyrene colloidal crystals as template," Electrochimica Acta, Mar. 2013, vol. 99, pp. 1-8.
Zhou et al., "Surface plasmon resonance-mediated photocatalysis by noble metal-based composites under visible light", Journal of Materials Chemistry, 2012, vol. 22, pp. 21337-21354.

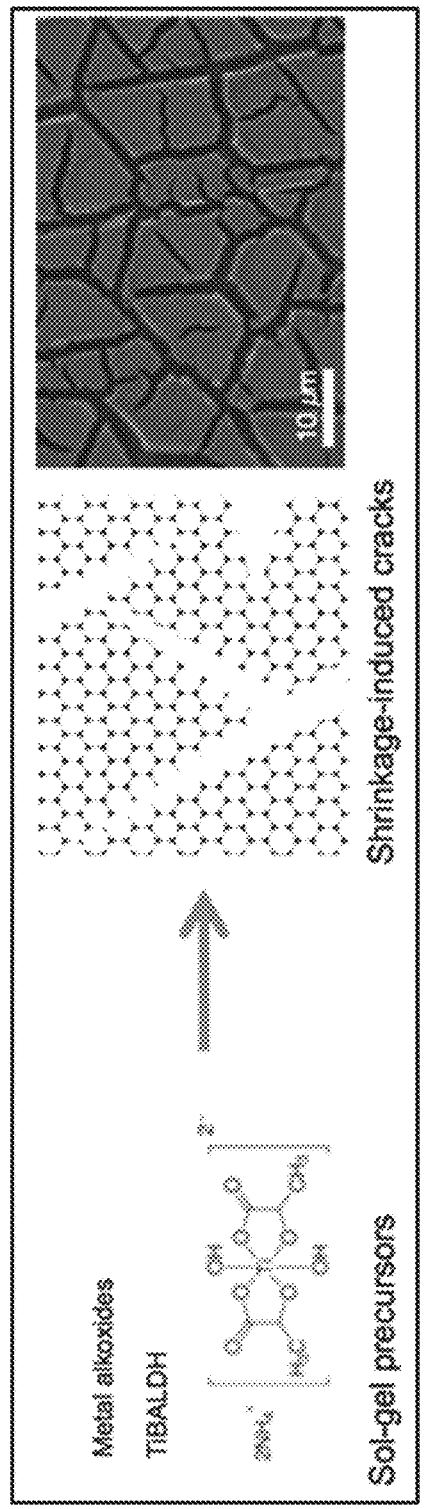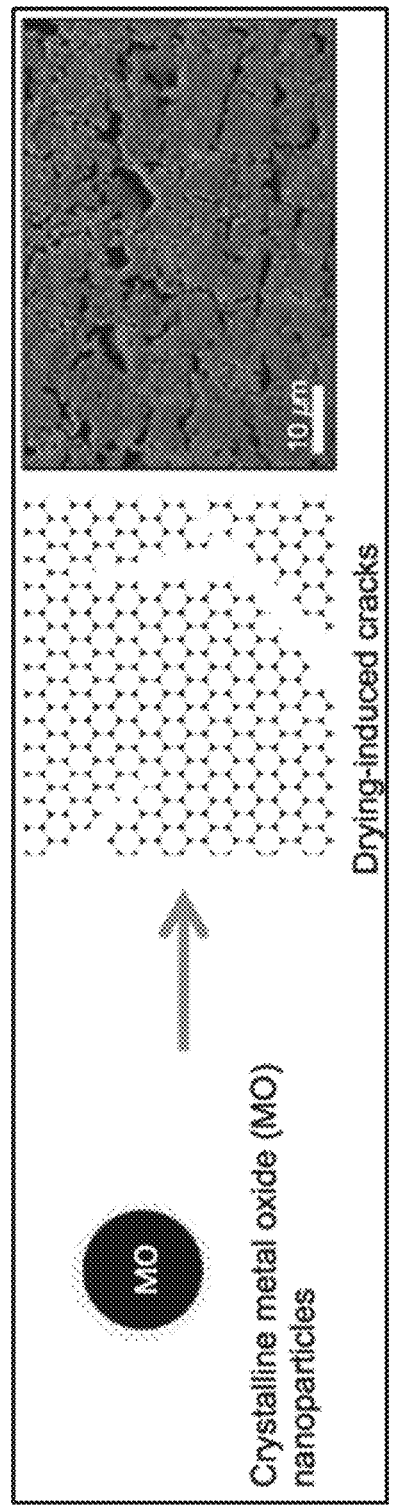
FIG. 2A
FIG. 2B

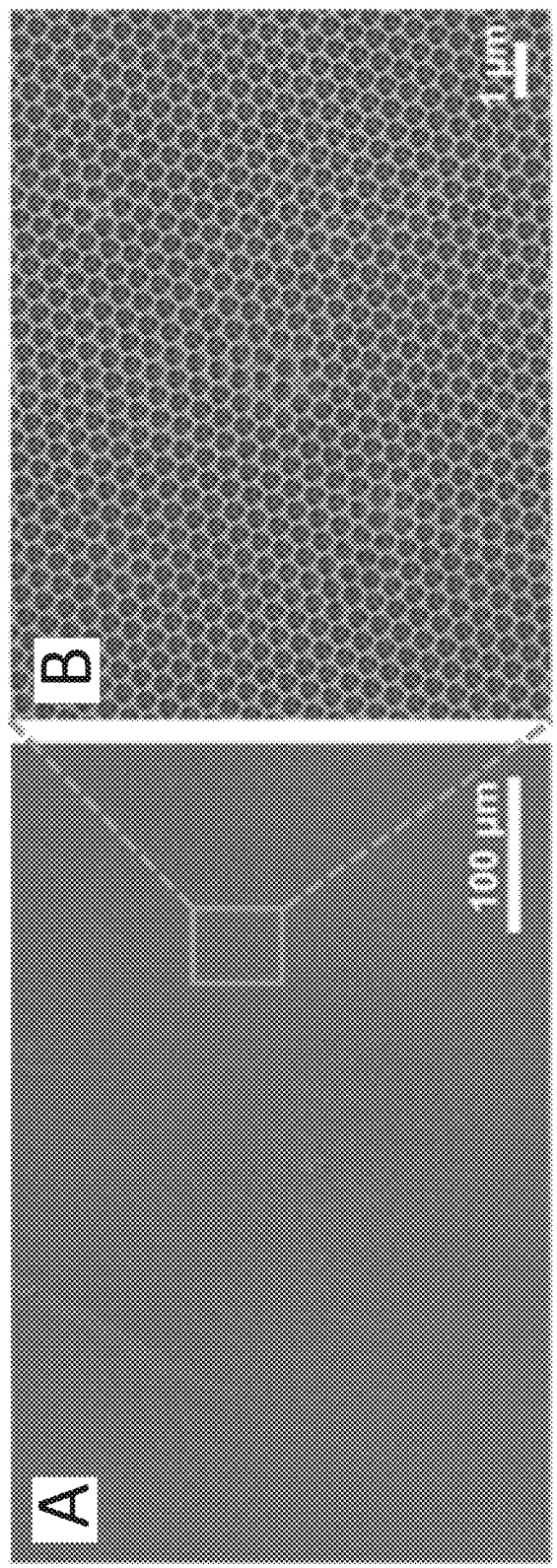

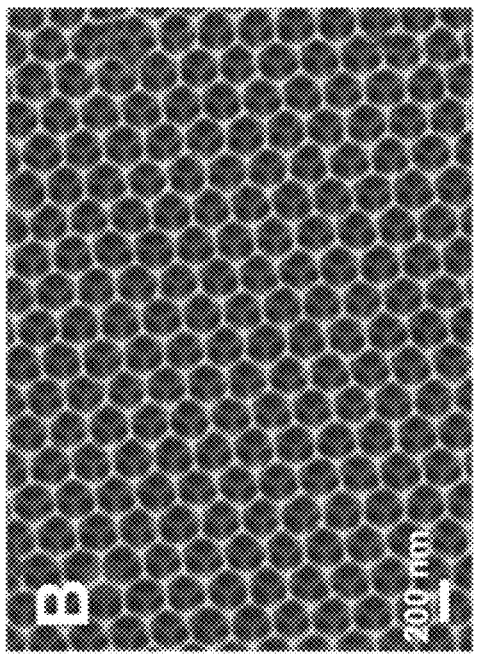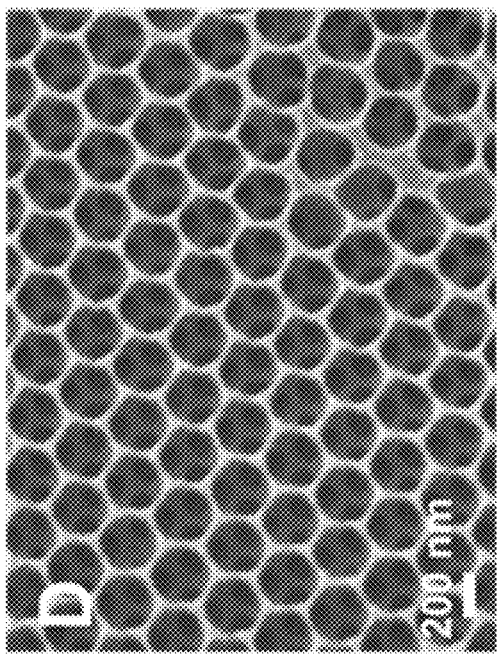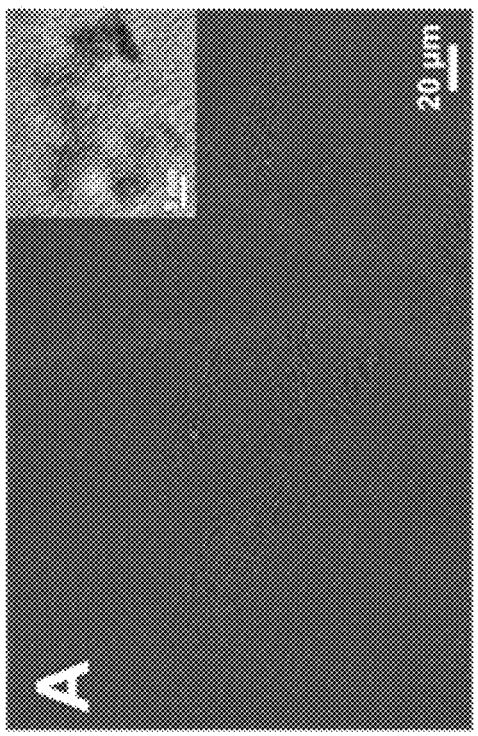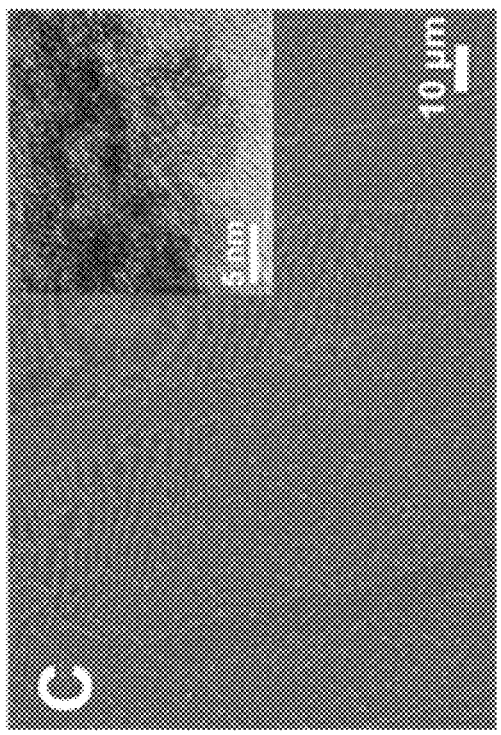

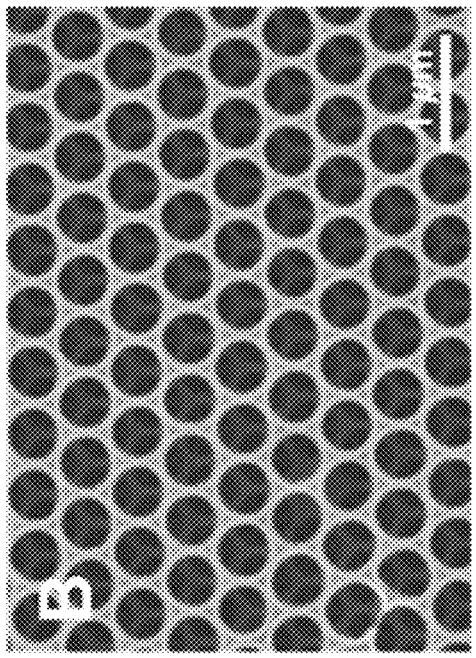
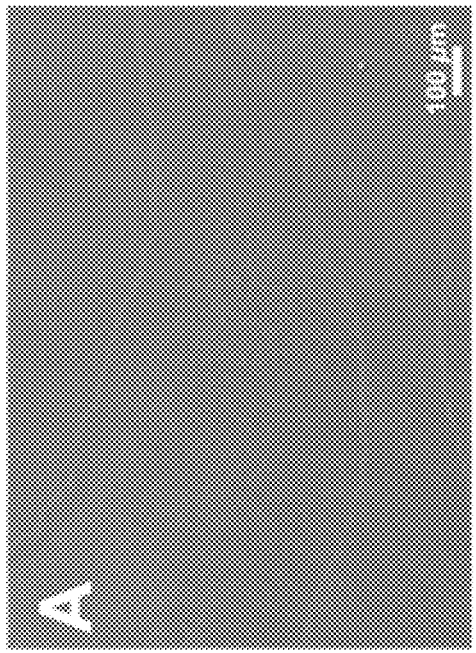
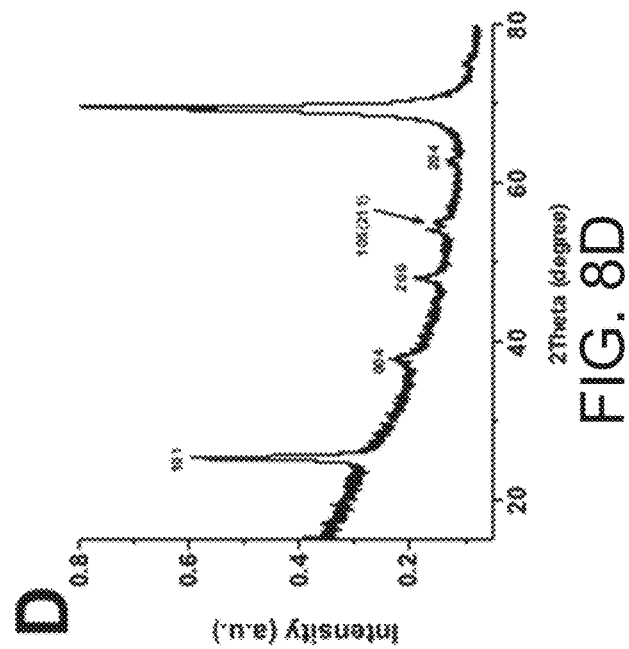
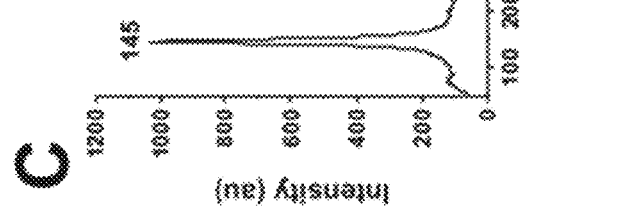

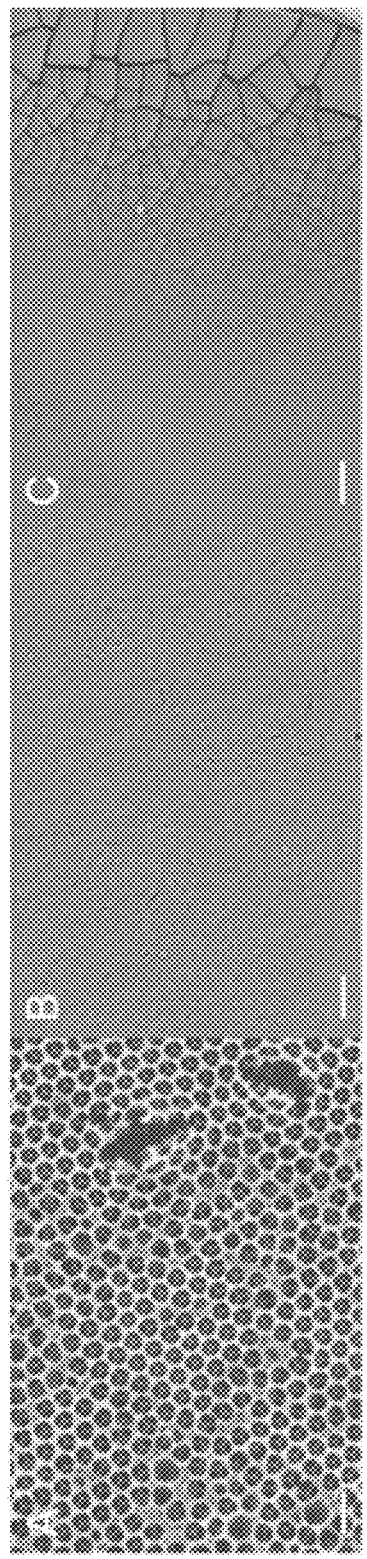

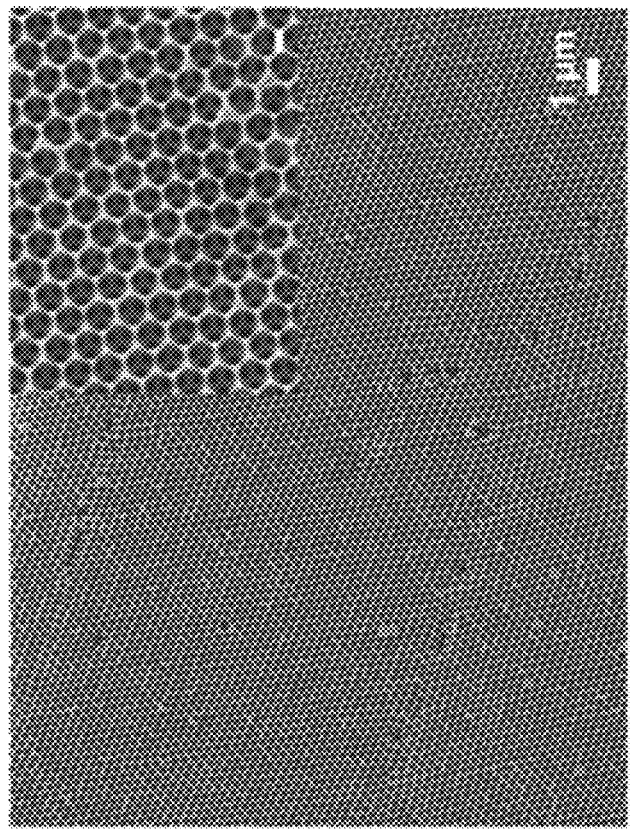
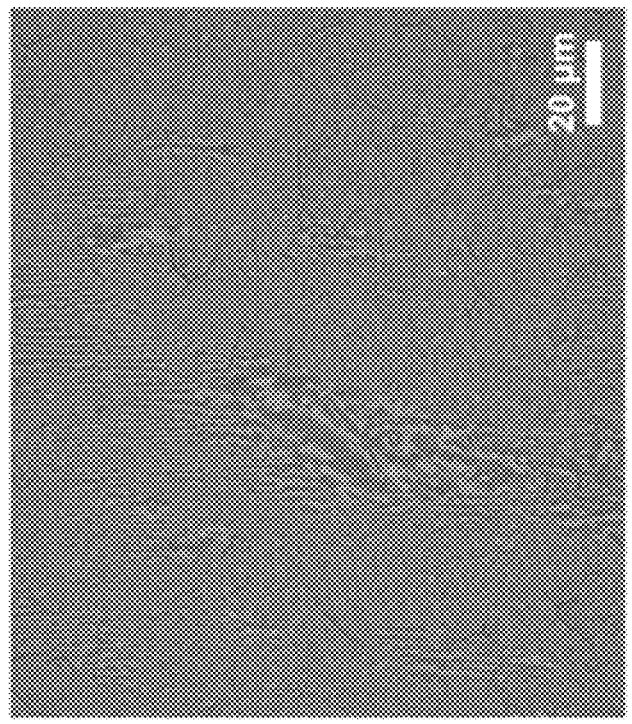
FIG. 11B
FIG. 11A

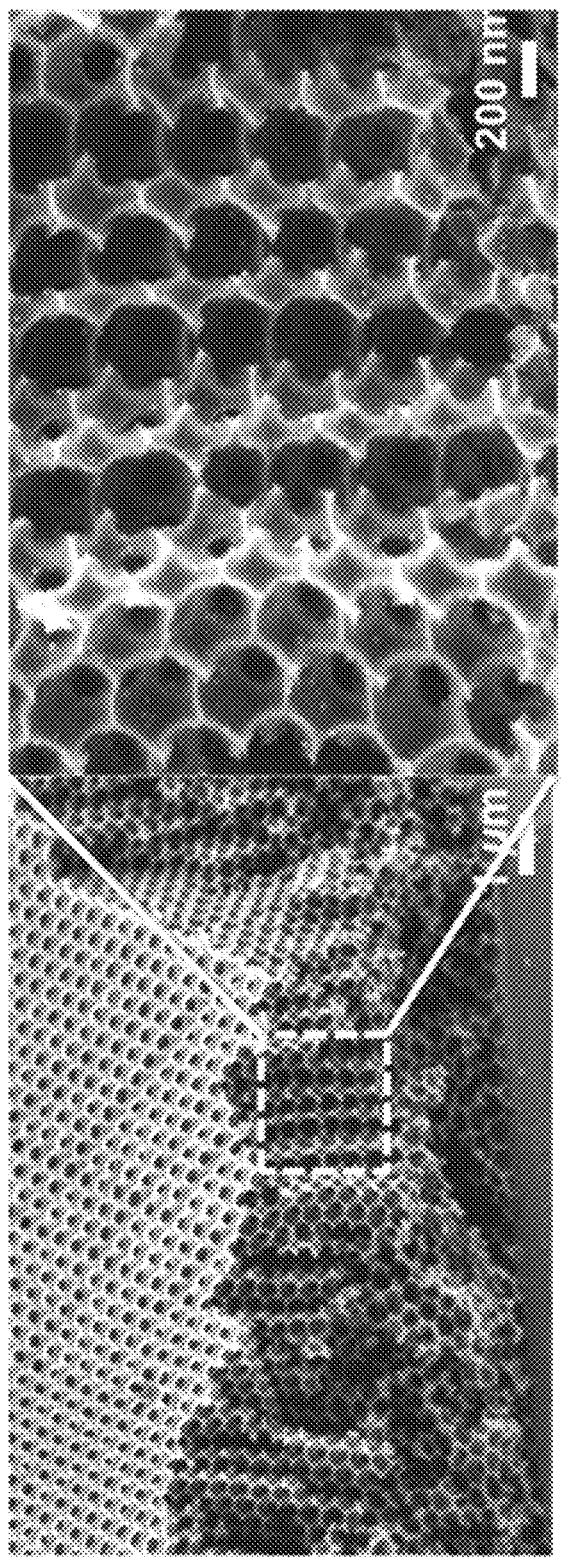

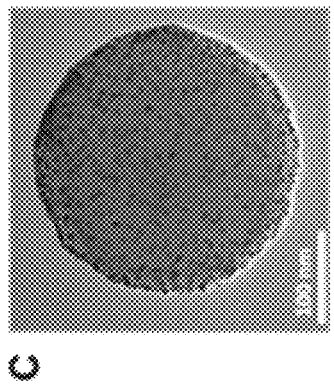
FIG. 16A PS@AuNP
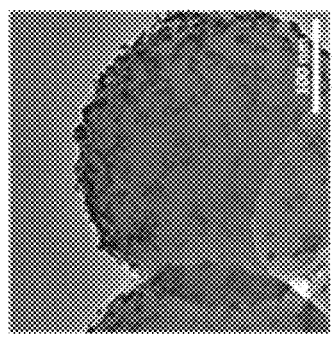
FIG. 16B PS@PtNP
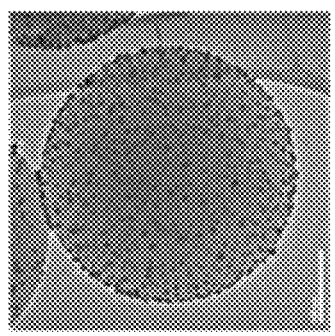
FIG. 16C PS@PdNP
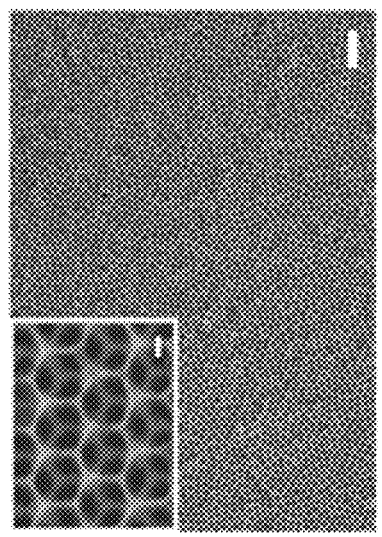
FIG. 16D
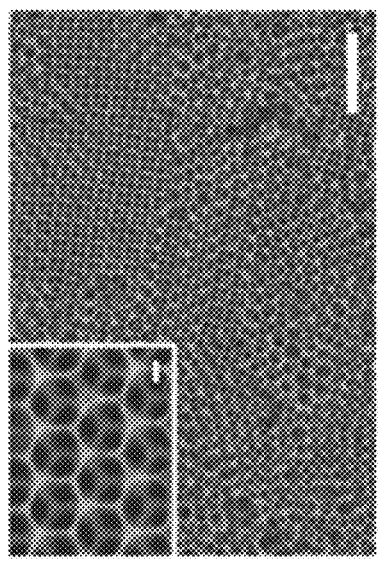
FIG. 16E
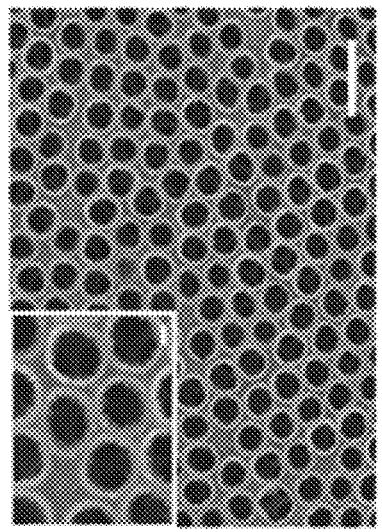
FIG. 16F

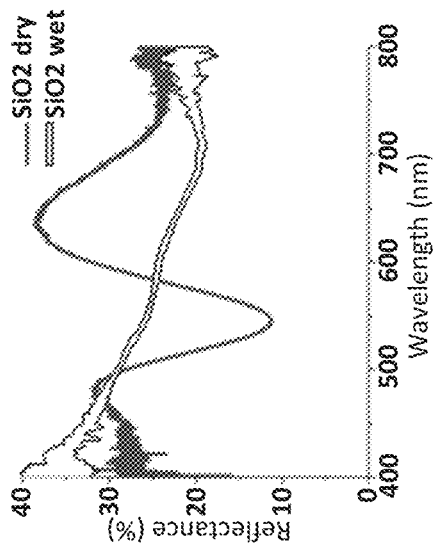
FIG. 18A FIG. 18B FIG. 18C
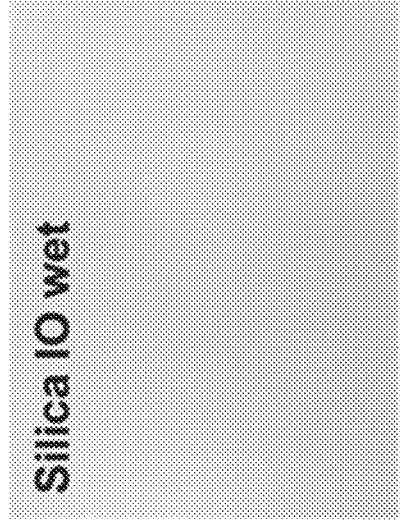
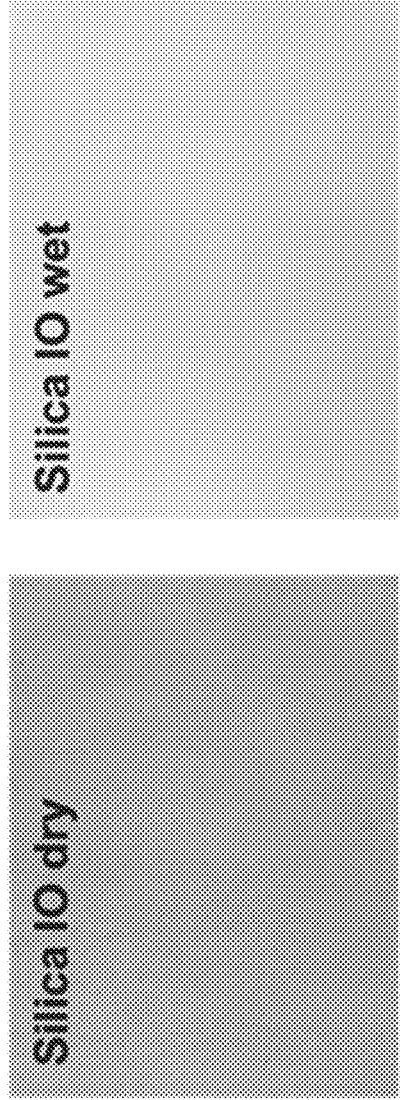
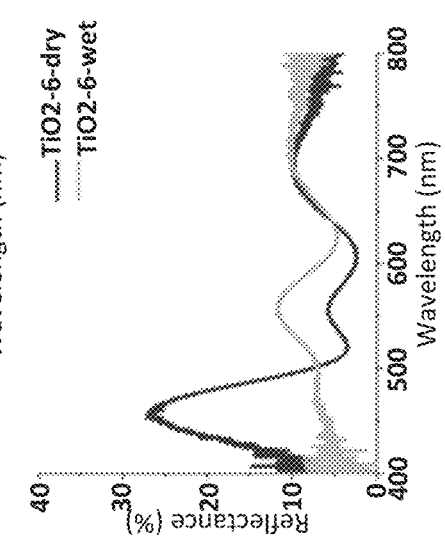
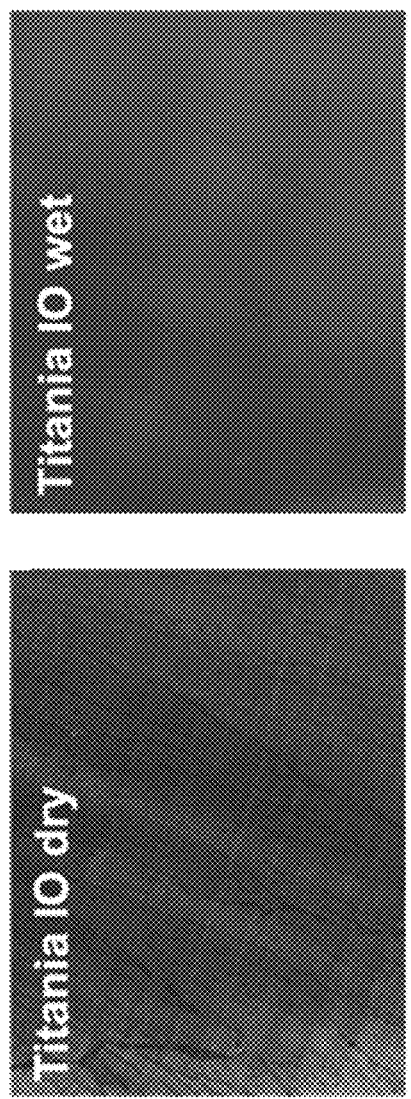
FIG. 18D FIG. 18E FIG. 18F

FORMATION OF HIGH QUALITY TITANIA, ALUMINA AND OTHER METAL OXIDE TEMPLATED MATERIALS THROUGH COASSEMBLY

CROSS-REFERENCE TO RELATED APPLICATIONS

This application is a Continuation Applications of U.S. patent application Ser. No. 16/089,805, filed Sep. 28, 2018, now U.S. Pat. No. 11,192,796, which is a National Stage Application of PCT International Application No. PCT/US17/25721 filed Apr. 3, 2017, which claims the benefit of U.S. Patent Application No. 62/316,772, filed Apr. 1, 2016, all of which are incorporated in their entirety by reference.

STATEMENT OF GOVERNMENT RIGHTS

This invention was made with government support under N66001-11-1-4180 awarded by the U.S. Department of Defense/DARPA, under DE-AR0000326 awarded by the U.S. Department of Energy/ARPA-E, and under N00014-11-1-0641 awarded by the U.S. Department of Defense/ONR.

INCORPORATION BY REFERENCE

All patents, patent applications and publications cited herein are hereby incorporated by reference in their entirety in order to more fully describe the state of the art as known to those skilled therein as of the date of the invention described herein.

FIELD OF THE INVENTION

The present application relates to the formation of high-quality templated materials. More particularly, the present application relates to mixed amorphous-crystalline precursors for templating metal oxide structures, for example inverse opals, using co-assembly.

BACKGROUND

Inverse replicas of opals, or "inverse opals," comprise regular arrangements of pores that collectively exhibit light reflective properties and methods of making the same.

SUMMARY

In accordance with certain embodiments, a co-assembly method for synthesizing templated materials, such as inverse photonic structures, is described. The method includes combining an onium compound with a sol-gel precursor to form metal oxide (MO) nanocrystals, where each MO nanocrystal has crystalline and amorphous content (i.e., a crystalline phase and an amorphous phase). The MO nanocrystals are combined with templating particles to form a suspension. The combining can comprise arranging the templating particles into a direct opal structure. A solvent is evaporated from the suspension to form an intermediate or compound product. The intermediate or compound product can then be calcined to produce a templated material, such as an inverse opal or other inverse structure. The templated material can be a photonic structure.

In accordance with certain embodiments, the onium compound is a quarternary ammonium salt, for example an alkyl ammonium hydroxide such as tetramethyl ammonium hydroxide (TMAH). A molar ratio of the onium compound to the sol-gel precursor can be at least about 0.05, for example between about 0.3 and about 1.85. Combining the onium compound with the sol-gel precursor can be performed in a liquid, which can comprise at least one of an aqueous solvent, an organic solvent, and a mixed solvent.

In accordance with certain embodiments, the sol-gel precursor includes titanium isopropoxide (TIP), aluminum isopropoxide (AIP), and/or zirconium 1-propoxide (ZIP).

In accordance with certain embodiments, the metal oxide nanocrystals comprise at least one of: titania, zirconia, alumina, iron oxide, zinc oxide, tin oxide, beryllia, noble metal oxide, platinum group metal oxide, hafnia, molybdenum oxide, tungsten oxides, rhenium oxides, tantalum oxides, niobium oxides, vanadium oxide, chromium oxides, scandium oxides, yttria, lanthanum oxides, ceria, thorium oxides, uranium oxides, other rare earth oxides, and combinations thereof.

In accordance with certain embodiments, the suspension has a final solid content in a range of about 0.05% to about 10% by weight, or of up to about 20% by weight. The suspension can be dispersed, for example, within a droplet having a diameter that is between about 0.1 µm and about 10 mm, or between about 0.5 µm and about 5 mm, or between about 1 µm and about 1 mm.

In accordance with certain embodiments, the compound product is a thin film deposited onto a surface, such as a surface of a substrate. In some such embodiments, the method also includes suspending the substrate in the suspension prior to the solvent evaporation.

In accordance with certain embodiments, the templating particles include a colloidal suspension of spherical, elongated, concave, amorphous, or facetted particles made from polymer, metal, metal oxide, supramolecular aggregates, crystals of organic inorganic and organometallic compounds, or salts. For example, the templating particles can include a colloidal suspension of polymeric spheres. In some implementations, the templating particles can also comprise metal nanoparticles.

In accordance with certain embodiments, the photonic structure comprises titania. The photonic structure can be formed as a film, a brick, or a spherical particle. The photonic structure can be crack-free for at least 10,000 repeat units thereof.

In accordance with certain embodiments, the method also includes combining the metal oxide nanocrystals and the templating particles with functional nanoparticles, which may include one or more metals (e.g., metal nanoparticles).

In accordance with certain embodiments, the inverse opal comprises at least one of: a titania-gold nanoparticle inverse opal film, a titania-platinum nanoparticle inverse opal film, a titania-palladium nanoparticle inverse opal film, titania-gold nanoparticle inverse opal photonic bricks, and spherical titania-gold nanoparticle inverse opal particles.

Templated structures described herein can be useful in structural pigments, cosmetic products, pharmaceutical products, edible products, drug delivery device/mechanisms, fluidic devices, cooling devices, tissue engineering, membranes, sensors, filtration, sorption/desorption, support media, acoustic devices, batteries, fuel cells, photoactive catalysts, catalytic mediums or supports, coherent scattering media, patterned structure fabrication, light emitters, random lasing or other optical applications, such as smart displays or other electrochromic materials.

In some implementations, the coassembly method includes combining an alkyl ammonium compound with a metal alkoxide to form MO nanocrystals, e.g., titanium dioxide (TiO$_2$) nanocrystals, which are combined with a polymeric colloid to form a suspension. Solvent is evaporated from the suspension to form an intermediate product, which then undergoes calcination to produce an inverse opal.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIG. 2A illustrates a titanium(IV) bis(ammonium lactato) dihydroxide (TiBALDH) sol-gel precursor and the resulting microstructure (schematic and scanning electron microscope (SEM) image) when the TiBALDH is used to co-assemble an inverse opal.

FIG. 2B illustrates a crystalline metal oxide (MO) nanoparticle and the resulting microstructure (schematic and scanning electron microscopy (SEM) image) when the MO nanoparticle is used to co-assemble an inverse opal.

FIGS. 4A-4B are SEM images of large-area, crack-free titania inverse opal films using 420 nm PS colloids on (ITO coated PET) conductive plastic substrate using nanocrystalline titania, in accordance with certain embodiments.

FIGS. 5A-5B are SEM images of an alumina inverse opal film on a silicon substrate, fabricated using Al$_2$O$_3$ nanocrystals, in accordance with certain embodiments.

FIGS. 5C-5D are SEM images of a zirconia inverse opal film on a silicon substrate, fabricated using ZrO$_2$ nanocrystals, in accordance with certain embodiments.

FIG. 8A is a SEM image of a TiO$_2$ inverse opal film, made using nanocrystals synthesized with a TIP:TMAH ratio $R_{TIP/TMAH}$ of about 0.5, in accordance with certain embodiments.

FIG. 8B is a higher magnification SEM image of the TiO$_2$ inverse opal film of FIG. 17A, in accordance with certain embodiments.

FIG. 8C is a Raman spectrum of a TiO$_2$ inverse opal film after calcination at 500° C., the Raman spectrum indicating an anatase structure, in accordance with certain embodiments.

FIG. 8D is an x-ray diffractometry (XRD) spectrum of an anatase TiO$_2$ inverse opal film synthesized with a TIP:TMAH ratio $R_{TIP/TMAH}$ of about 0.5, the TiO$_2$ inverse opal film disposed on a silicon substrate after calcination at 500° C., in accordance with certain embodiments.

FIG. 9A is a SEM image of a TiO$_2$ inverse opal film synthesized with NC, in accordance with certain embodiments.

FIG. 9B is a SEM image of the TiO$_2$ inverse opal film of FIG. 9A, taken at a lower magnification than in FIG. 9A, in accordance with certain embodiments.

FIG. 9C is a SEM image of the TiO$_2$ inverse opal film of FIG. 9A, taken at a lower magnification than in FIG. 9A, in accordance with certain embodiments.

FIG. 11A is a SEM image of a ZrO$_2$ inverse opal film, synthesized from nanocrystals synthesized with a Zr1P:TMAH ratio $R_{Zr1P/TMAH}$ of about 1, in accordance with certain embodiments.

FIG. 11B is a higher magnification SEM image of the ZrO$_2$ inverse opal film of FIG. 11A, in accordance with certain embodiments.

FIG. 14A is a SEM image of a TiO$_2$ inverse opal film incorporating gold nanoparticles (Au NP), in accordance with certain embodiments.

FIG. 14B is a higher magnification SEM image of the TiO$_2$ inverse opal film incorporating Au NP of FIG. 14A.

FIG. 16A is a TEM image of a PS colloid modified with 5 nm Au NP to form a raspberry-shaped particle, in accordance with certain embodiments.

FIG. 16B is a TEM image of a PS colloid modified with 7 nm platinum (Pt) nanoparticles to form a raspberry-shaped particle, in accordance with certain embodiments.

FIG. 16C is a TEM image of a PS colloid modified with 10 nm palladium (Pd) nanoparticles to form a raspberry-shaped particle, in accordance with certain embodiments.

FIG. 16D is a SEM image of a $TiO_2$ inverse opal structure with incorporated Au NP, made from the raspberry-shaped particle of FIG. 16A, in accordance with certain embodiments.

FIG. 16E is a SEM image of a $TiO_2$ inverse opal structure with incorporated Pt nanoparticles, made from the raspberry-shaped particle of FIG. 16B, in accordance with certain embodiments.

FIG. 16F is a SEM image of a $TiO_2$ inverse opal structure with incorporated Pd nanoparticles, made from the raspberry-shaped particle of FIG. 16C, in accordance with certain embodiments.

FIG. 18A is an optical image of a silica-based inverse opal (IO) paint when dry, in accordance with some embodiments.

FIG. 18B is an image of the silica-based IO paint of FIG. 18A, when wet, in accordance with some embodiments.

FIG. 18C is a plot of the % reflectance for both the dry silica-based IO paint of FIG. 18A, and for the wet silica-based IO paint of FIG. 18B.

FIG. 18D is an optical image of a titania-based inverse opal (IO) paint when dry, in accordance with some embodiments.

FIG. 18E is an image of the titania-based IO paint of FIG. 18D, when wet, in accordance with some embodiments.

FIG. 18F is a plot of the % reflectance for both the dry titania-based IO paint of FIG. 18D, and for the wet titania-based IO paint of FIG. 18E.

DETAILED DESCRIPTION OF THE INVENTION

Figure 1:
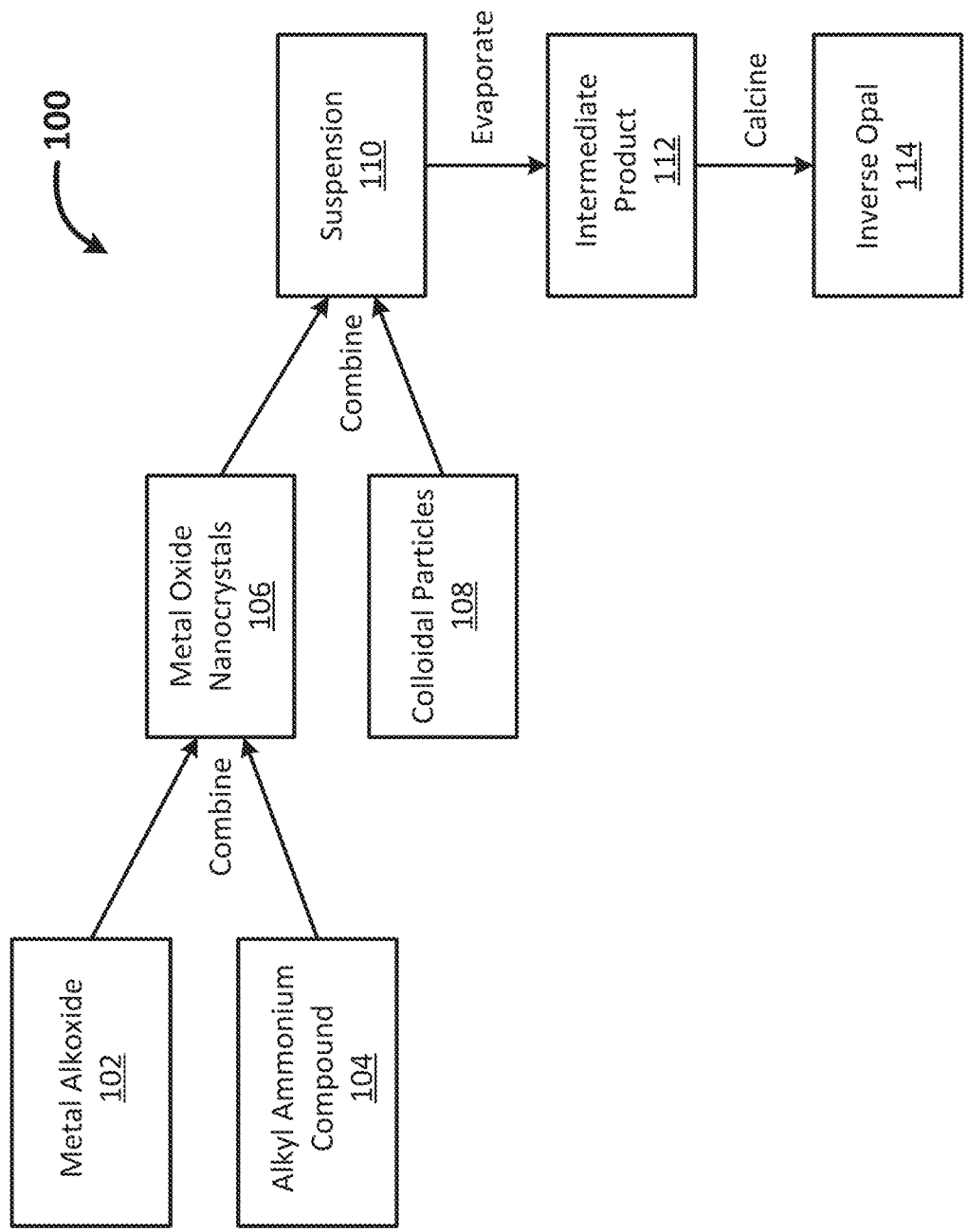
FIG. 1 is a diagram of a coassembly method for synthesizing photonic structures utilizing metal oxide nanocrystals, in accordance with certain embodiments.

Inverse opals are ordered, porous structures formed from colloidal crystals, and this structuration provides them with many properties. In particular, their porosity facilitates wetting and fluidics studies and applications, and their periodicity facilitates optical and photonic studies and applications. Furthermore, altering their composition can provide inverse opals with additional chemical functionality. Inverse opals are typically comprised of polymers, metals, or metal oxides, and the specific material can be tailored for the application, for example by making colorimetric sensors using stimuli-responsive materials, making porous catalysts using catalytically active materials, or making electrodes using electroactive materials.

The formation of inverse opal films of titania, alumina, zirconia and other non-silica metal oxide compounds has typically been based mostly on a three-step method. First, a sacrificial direct opal template is formed using colloidal particles, such as polymeric colloidal particles. Then, the preformed direct opal structure is infiltrated (or "backfilled") with a metal oxide precursor to form a matrix around the direct opal structure. Transition metal oxide inverse opals have been made previously with a variety of backfilling methods, including dip-coating, dropcasting, spin coating, or vapor-phase deposition. Then, the templating colloidal particles forming the direct opal structure are removed, leaving behind the metal oxide matrix. For example, calcination, which promotes hydrolysis, crystallization, and sintering of the matrix, in addition to removal of the templating polymeric colloids, is commonly used. While major success has been achieved in producing defect-free and crack-free inverse opal silica structures using this methodology, non-silica metal oxide inverse opals, e.g., titania, alumina, zirconia and their mixtures show significant defects, such as cracks, and no methods have been developed so far to overcome this problem.

Examples of metal oxide precursors used in the conventional method described above include sol-gel precursors (e.g., water-soluble titanium(IV) bis(ammonium lactato) dihydroxide (TiBALDH), as well as highly reactive titanium alkoxides for titania; water-soluble aluminum alkoxides stabilized with acetyl acetone for alumina; and highly reactive zirconium alkoxides that can be stabilized with acetyl acetone for zirconia) and various oxide nanoparticles (both commercially available as well as synthesized precursors).

The traditional approach outlined above has not, therefore, been suitable for the creation of large-scale crack-free inverse opals of metal oxides. Rather, conventional methods often result in cracked structures due to natural crack formation during the drying of the colloidal crystal film (e.g., via shrinkage), and/or due to a substantial change in the density of the matrix during drying and crystallization (e.g., for crystalline oxides). For example, FIG. 2A illustrates a titanium(IV) bis(ammonium lactato) dihydroxide (TiBALDH) sol-gel precursor and the resulting microstructure (schematic and scanning electron microscope (SEM) image) when the TiBALDH is used to synthesize an inverse opal, in accordance with certain embodiments. FIG. 2B illustrates a crystalline metal oxide (MO) nanoparticle and the resulting microstructure (schematic and scanning electron microscopy (SEM) image) when the MO nanoparticle is used to synthesize an inverse opal, in accordance with certain embodiments. Cracks are clearly visible in the microstructures of FIGS. 2A and 2B.

When backfilling direct opals, these cracks in the opal can undesirably become filled with matrix material. Furthermore, a single infiltration step can be insufficient to fill all the voids within the templating colloidal structure, and therefore is usually repeated via multiple filling/infiltration steps. Multiple filling/infiltration steps can further lead to the formation of non-infiltrated voids within the matrix as well as to the formation of non-templated overlayers. Moreover, many sol-gel precursors have a high reactivity to moisture, and are limited to being processed in inert conditions. In addition, since the conventional approach is based on the pre-existing templating colloidal assemblies, it lacks the flexibility to dynamically control the self-assembly process, making it impossible to achieve certain structures or to incorporate functional components above a certain size.

The inventors previously developed a co-assembly method using a sol-gel silica precursor (U.S. Patent Application Publication Number 2011/0312080). However, such precursors for other metal oxides lack one or more of the properties needed to produce high quality structures, such as: the ability to prevent destabilization of the colloidal dispersion (e.g., flocculation, formation of aggregates, or inducing disorder), the ability to avoid drying- or calcination-induced cracks, for example by matching the kinetics between the colloidal assembly and hydrolysis/polymerization of the sol-gel precursor, and the ability to avoid excessive densification of the oxide phase during the amorphous-to-crystalline transition of the metal oxide. Moreover, traditional precursors can be incompatible with the incorporation of additional components (e.g. functional nanoparticles, nanocrystals, quantum dots, etc.), under which circumstances the surface chemistry and charges on the precursor are extremely important.

The present disclosure describes inverse opal fabrication methods that overcome shortcomings of the conventional approaches outlined above, for example by facilitating the formation of highly ordered metal oxide compound opals through a one-step co-assembly procedure using aqueous solutions of specifically designed MO nanocrystals and templating polymeric colloids, leading to high-quality inverse opal structures. For thin films of inverse opals, they can be devoid of lateral cracks above 10,000 repeat units of the templating spheres, which is at least 10 times larger than conventional methods. Methods described herein produce high quality, large area inverse opal films and inverse opal powders, and can be used in combination with microfluidic techniques to form photonic micro-particles (e.g., of a spherical shape). Methods described herein also allow for the incorporation of dopants, such as metal nanoparticles, quantum dots, and various pigments, into the oxide matrix of the inverse opals to achieve color purification and/or saturation, as well as to impart additional functionalities, such as catalytic activity, load and release of guest compounds, or unique light emission capability. In some embodiments, the inverse opal fabrication method does not include the use of a sol-gel precursor.

Figure 2C:
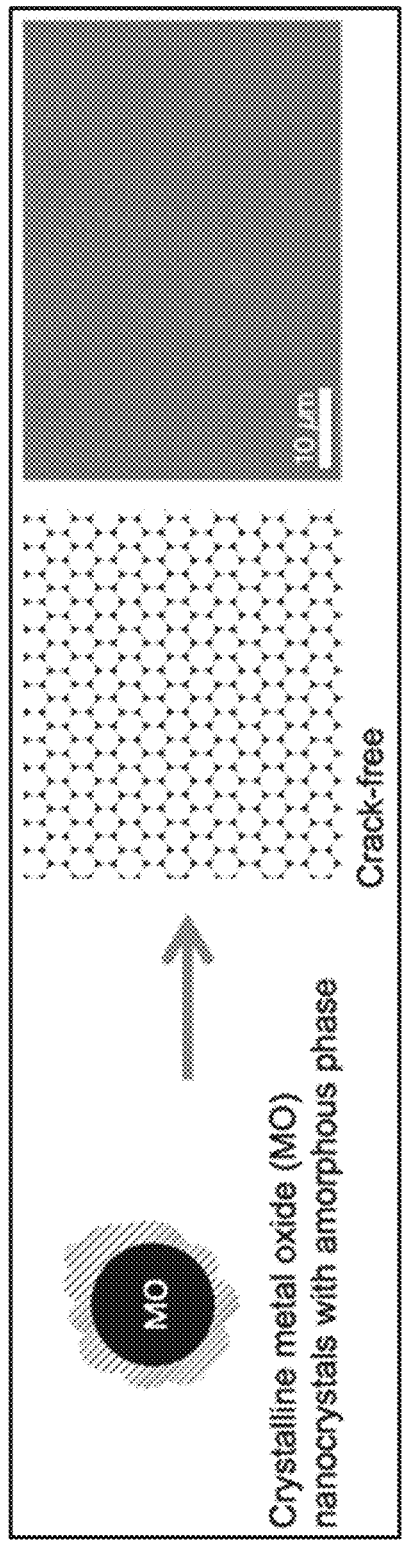
FIG. 2C illustrates a crystalline MO nanocrystal with amorphous phase and the resulting microstructure (schematic and scanning electron microscope (SEM) image) when the crystalline MO nanocrystal with amorphous phase is used to synthesize an inverse opal, in accordance with certain embodiments.

In the present disclosure, different co-assembly precursors are employed, and a variety of more widely-applicable methods of making precursors for co-assembly of high-quality inverse opals from a variety of transition metal oxides is set forth. For example, FIG. 2C illustrates a MO nanocrystal with a crystalline core and amorphous phase, prepared according to methods discussed herein, and the resulting microstructure (schematic and scanning electron microscope (SEM) image) when the MO nanocrystal with a crystalline core and amorphous phase is used to synthesize an inverse opal. As can be seen in FIG. 2C, the resulting microstructure of the inverse opal thin film is crack-free for at least about 10,000 repeat units of the photonic crystal structure.

A number of optical, chemical, and sensing applications are facilitated by defect-free inverted colloidal crystals, and the properties of these inverse opal structures are further expanded by controlling their composition. High-quality, crack-free silica inverse opals with minimal defects can be self-assembled using colloidal crystallization in the presence of a sol-gel precursor, however, this co-assembly process remains challenging for transition metal oxide inverse opals. The present disclosure describes methods for assembling highly ordered, crack-free inverse opals by controlling the state of the matrix precursor, using the synthetic conditions of transition metal oxide nanocrystals to control the surface charge and crystallinity of the precursor. Some embodiments relate to titania, however the process can be extended to other oxides, such as metal oxides, and other material classes, as well as to other morphologies and templating structures.

Photonic Structures

Photonic structures that can be produced according to methods described herein include highly ordered inverse opal structures with a variety of morphologies, such as thin films, bricks, balls, and bulk materials. In certain embodiments, these inverse opal structures are crack-free for at least 10,000 repeat units. In certain embodiments, these inverse opal structures are crack-free for at least 1,000 repeat units. In certain embodiments, these inverse opal structures are crack-free for at least 100 repeat units. In certain embodiments, these inverse opal structures are crack-free for at least 5 repeat units.

In certain embodiments, the inverse opal structures are composed of, or substantially of, a metal oxide matrix and air holes.

Some other exemplary structures include "compound opals" wherein colloidal particles are present as well as the matrix component. Many different types of colloidal particles can be utilized. The colloids can be made from various materials or mixtures of materials. In certain embodiments, the materials are metals, such as gold, palladium, platinum, tin, silver, copper, rhodium, ruthenium, rhenium, titanium, osmium, iridium, iron, cobalt, nickel or combinations thereof. In certain embodiments, the materials are semiconductor materials, such as silicon, germanium, silicon doped with group III or V elements, germanium doped with group III or V elements, tin doped with group III or V elements, and combinations thereof. In certain embodiments, the materials include catalysts for chemical reactions. In certain embodiments, the materials are oxides, such as silica, titania, zirconia, alumina, iron oxide, zinc oxide, tin oxide, beryllia, noble metal oxide, platinum group metal oxide, hafnia, molybdenum oxide, tungsten oxides, rhenium oxides, tantalum oxides, niobium oxides, vanadium oxide, chromium oxides, scandium oxides, yttria, lanthanum oxides, ceria, thorium oxides, uranium oxides, other rare earth oxides, and combinations thereof. In certain embodiments, the materials are metal sulfides, metal chalcogenides, metal nitrides, metal pnictides, and combinations thereof. In certain embodiments, the materials are organometallics, including various metal organic frameworks (MOFs), inorganic polymers (such as silicones), organometallic complexes, and combinations thereof. In certain embodiments, the colloids are made from organic materials, including polymers, natural materials, and mixtures thereof. In certain embodiments, the material is a polymeric material, such as poly(methyl methacrylate) (PMMA), other polyacrylates, other polyalkylacrylates, substituted polyalkylacrylates, polystyrene (PS), poly(divinylbenzene), poly(vinylalcohol) (PVA), and hydrogels. Other polymers of different architectures can be utilized as well, such as random and block copolymers, branched, star and dendritic polymers, and supramolecular polymers. In certain embodiments, the material is a natural material, such as a protein- or polysaccharide-based material, silk fibroin, chitin, shellac, cellulose, chitosan, alginate, gelatin, and mixtures thereof.

Formation of Inverse Opal Films

In some implementations described herein, a one-pot procedure is used to synthesize MO nanocrystals in conjunction with colloidal particles to form a photonic structure. FIG. 1 is a diagram of a coassembly method 100 for synthesizing photonic structures, in accordance with certain embodiments. As shown in FIG. 1, a metal complex 102 is combined with an alkyl ammonium compound 104 to form MO nanocrystals 106. The metal complex can be a sol-gel precursor, for example a metal alkoxide such as titanium isopropoxide (TIP). The alkyl ammonium compound 104 can be a quaternary ammonium salt, for example tetramethyl ammonium hydroxide (TMAH). The nanocrystals 106 are then combined with colloidal particles 108 (e.g., polymeric colloidal particles), also referred to herein as templating particles (which can be spherical) to form a suspension 110 that includes a solvent (e.g., water). The solvent is evaporated from the suspension 110, thereby forming an intermediate product 112 that subsequently undergoes calcination to produce an inverse opal 114.

In certain embodiments, the suspension has a final solid content of up to about 20% by weight, for example in a range of about 0.05% to about 10% by weight. In certain embodiments, the suspension has a final solid content of up to 30 w %. In certain embodiments, the suspension has a final solid content of up to 40 w %. In certain embodiments, the suspension has a final solid content of up to 50 w %. In certain embodiments, the suspension has a final solid content of up to 60 w %. In certain embodiments, the suspension has a final solid content of up to 70 w %. In certain embodiments, the suspension has a final solid content of up to 80 w %. In certain embodiments, the suspension has a final solid content of up to 90 w %. In certain embodiments, the suspension has a final solid content of up to 100 w %.

In certain embodiments, sizes (e.g., diameters) of the templating particles can range from about 5 nm to several tens or hundreds of microns. Some exemplary sizes include about 100 nm to about 1000 nm to provide specific optical properties and/or improved assembly characteristics that are not largely affected by gravity. In certain embodiments, the size may range from about 100 nm to about 500 nm. As will be apparent to one of skill in the art, many types of sacrificial particles can be utilized.

In certain embodiments, the colloidal particles can be decorated with nanoparticles. In certain embodiments, the nanoparticles can include metal (e.g., gold, silver, platinum, palladium, ruthenium, rhodium, cobalt, iron, nickel, osmium, iridium, rhenium, copper, chromium, bimetals, metal alloys, and the like and combinations thereof) nanoparticles, semiconductor (e.g., silicon, germanium, and the like, pure or doped with elements or compounds of group III or V elements, and combinations thereof) nanoparticles, metal oxide (e.g., silica, titania, zirconia, alumina, iron oxide, zinc oxide, tin oxide, beryllia, noble metal oxide, platinum group metal oxide, hafnia, molybdenum oxide, tungsten oxides, rhenium oxides, tantalum oxides, niobium oxides, vanadium oxide, chromium oxides, scandium oxides, yttria, lanthanum oxides, ceria, thorium oxides, uranium oxides, other rare earth oxides, combinations thereof and the like) nanoparticles, metal sulfide nanoparticles, or combinations thereof.

In certain embodiments, selection of the desired nanoparticles can be based on providing certain desired properties. For example, palladium, platinum, or other noble metal or metal oxide particles can provide catalytic properties, while silver, copper, or oxide (e.g., $V_2O_5$) nanoparticles can provide antibacterial properties. Other nanoparticles, such as semiconductor nanoparticles for semiconducting properties, magnetic nanoparticles for magnetic properties, and/or quantum dots for optical properties, can be utilized as desired.

Synthesis of Metal Oxide (MO) Nanocrystals

Methods of metal oxide (MO) nanocrystal synthesis, according to embodiments described herein, comprise the combination of a metal alkoxide with an onium compound to form a reaction mixture. An onium compound, or onium ion, can be defined as a cation with univalent or multivalent groups covalently bound to a central atom from the pnictogen, chalcogen, or halogen group (e.g., tetramethyl ammonium, phosphonium, etc). The onium compound can include one or more onium cations with polyvalent substitutions (e.g., iminium, imidazolium, or pyridinium), pyrazolium, thiazolium, and/or have the form $NR_4^+$ (e.g., ammonium, pyrrolidinium), $PR_4^+$ (e.g., phosphonium), and $SR_3^+$ (e.g., sulfonium), where R can be, for example, H, alkyl, or aryl.

In certain embodiments, nanocrystals produced according to methods described herein have crystalline cores as well as an amorphous material disposed therein or thereon (e.g., in the form of a coating, layer, shell, and/or the like). The ratio of amorphous material to crystalline material can be controlled by one or more parameters of the synthetic process, such as temperature, stirring speed, reflux conditions, reflux time, pH, identity of base, concentration of ligand, aging time, etc. The biphasic nature of these resulting nanocrystals can have a favorable impact on the inverse opal structures that are subsequently formed from them, perhaps because the amorphous material can accommodate stresses during the assembly process, and thus help to minimize the formation of cracks that are seen in traditional inverse opals produced using traditional synthesis techniques.

Metal Oxide (MO) Nanocrystals

In certain embodiments, the MO nanocrystals have a dimension (e.g., a width or diameter) that is about 1 nm to about 50 nm. In certain embodiments, the MO nanocrystals have a crystalline core and an amorphous phase. In certain embodiments, the degree of crystallinity is estimated from thermal gravimetric analysis (TGA) measurements of the weight percent, for example by subtracting the weight percent at 500° C. from the weight percent at 120° C., and then dividing by the weight percent at 500° C.

Figure 2D:
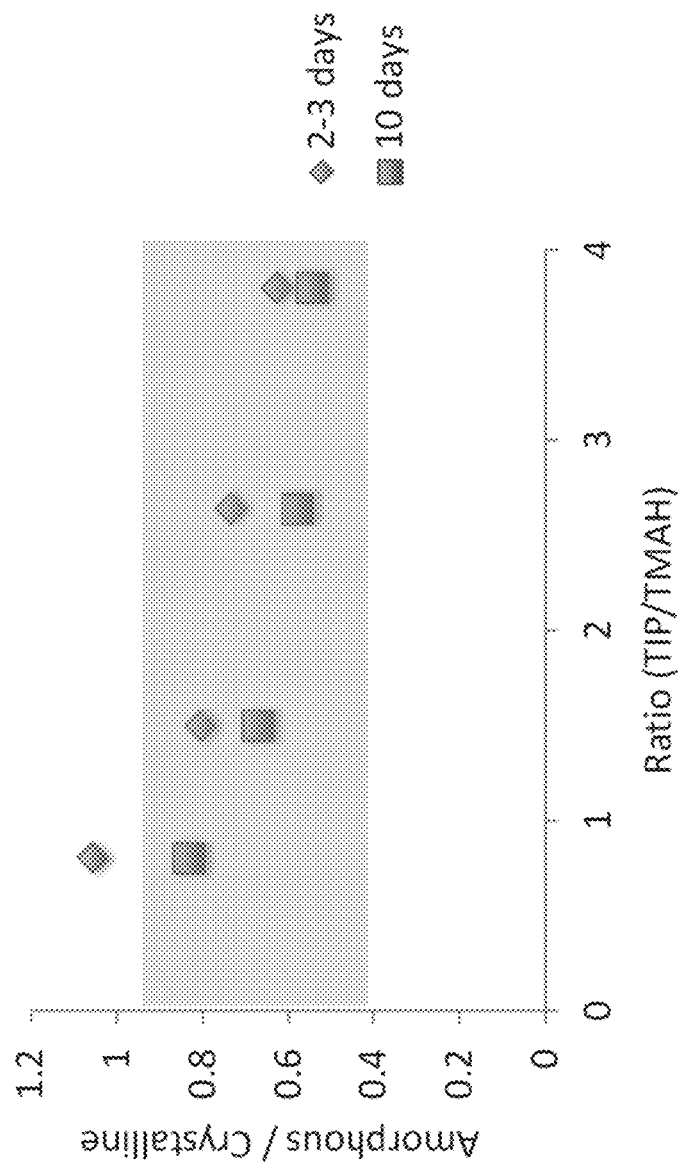
FIG. 2D is a plot showing the proportion of amorphous phase to crystalline phase in metal oxide nanocrystals, versus the ratio ($R_{TIP/TMAH}$) of titanium isopropoxide (TIP) to tetramethylammonium hydroxide (TMAH) used to prepare them, in accordance with some embodiments.

FIG. 2D is a plot showing the proportion of amorphous phase to crystalline phase in metal oxide nanocrystals, versus the ratio of TIP/TMAH used to prepare them, in accordance with some embodiments. As shown in FIG. 2D, the degree of crystallinity is in the range of 0.4-0.9, where 0.9 refers to the highest amount of amorphous material.

In certain embodiments, the MO nanocrystals can be titanium dioxide nanocrystals, aluminum oxide nanocrystals and/or zirconium oxide nanocrystals.

Incorporation of Functional Particles into Photonic Structures

The incorporation of a second material component into an inverse opal structure can give rise to synergistic effects, in that it can yield materials with improved or augmented functionalities and properties. For example, the incorporation of metal nanoparticles into inverse opal structures results in the coupling of photonic and plasmonic properties, providing additional control over the optical properties. Furthermore, incorporation of metal nanoparticles may be advantageous for catalysis, greatly expanding the possible applications of these composite materials. Metal nanoparticles have also been used for the antimicrobial, UV-absorbing, sensing, and electrocatalytic properties. Functional particles that can be incorporated into photonic structures described herein include metal (e.g., gold, silver, platinum, palladium, ruthenium, rhodium, cobalt, iron, nickel, osmium, iridium, rhenium, copper, chromium, bimetals, metal alloys, and the like and combinations thereof) nanoparticles, semiconductor (e.g., silicon, germanium, and the like, pure or doped with elements or compounds of group III or V elements, and combinations thereof) nanoparticles, metal oxide (e.g., silica, titania, zirconia, alumina, iron oxide, zinc oxide, tin oxide, beryllia, noble metal oxide, platinum group metal oxide, hafnia, molybdenum oxide, tungsten oxides, rhenium oxides, tantalum oxides, niobium oxides, vanadium oxide, chromium oxides, scandium oxides, yttria, lanthanum oxides, ceria, thorium oxides, uranium oxides, other rare earth oxides, and combinations thereof and the like) nanoparticles, metal sulfide nanoparticles, or combinations thereof.

In certain embodiments, selection of the desired functional particles can be based on providing certain desired properties. For example, Pd or Pt, other noble metal or metal oxide particles can provide catalytic properties, while Ag, copper, or oxide (e.g., $V_2O_5$) nanoparticles can provide antibacterial properties. Other nanoparticles, such as semiconductor nanoparticles for semiconducting properties, magnetic nanoparticles for magnetic properties, and/or quantum dots for optical properties, can be utilized as desired.

Previous attempts to include metal nanoparticles during co-assembly of titania using sol-gel precursors caused instability of the colloidal solution, resulting in precipitation. By contrast, utilizing the metal oxide nanocrystals described here in conjunction with the metal nanoparticles may allow maintaining the stability of the suspension, allowing formation of inverse opal photonic crystal structure having crack-free structures that extend for 10,000 repeat units of the inverse opal structure.

In some embodiments, a substrate surface can be activated in order to create hydroxyl groups. The surface activation can be done through exposure of the substrate to high temperature (e.g. calcination in air), and/or to etchants (e.g. piranha solution), and/or plasma.

In certain embodiments, a substrate can be made from a metal salt or oxide, such as silica, alumina, iron oxide, zinc oxide, tin oxide, alumina silicates, aluminum titanate, beryllia, noble metal oxide, platinum group metal oxide, titania, zirconia, hafnia, molybdenum oxide, tungsten oxide, rhenium oxide, tantalum oxide, niobium oxide, vanadium oxide, chromium oxide, scandium oxide, yttria, lanthanum oxide, ceria, thorium oxide, uranium oxide, other rare earth oxides, and combinations thereof.

In other embodiments, the substrate comprises a semiconductor, including at least one of: silicon carbide, silicon, germanium, tin, silicon doped with a group III element, silicon doped with a group V element, germanium doped with a group III element, germanium doped with a group V element, tin doped with a group III element, tin doped with a group V element, and a transition metal oxide.

In other embodiments, the substrate comprises at least one of a metal and a metal alloy, examples of which include stainless steel, ferritic steel (e.g., an iron-chromium alloy), austenitic steel (a chromium-nickel alloy), copper, nickel, brass, gold, silver, titanium, tungsten, tin, aluminum, palladium, and platinum.

In certain embodiments, the substrate can be made from a ceramic material, such as cordierite, Mullite, zeolite, and natural or synthetic clay.

In other embodiments, the substrate comprises a combination of composite metal and metal oxide, such as cermet.

In still other embodiments, the substrate comprises an organic or inorganic material or combination thereof.

In still other embodiments, the substrate comprises a polymer, such as polyurethane, and/or comprises at least one of: polyethyleneterephthalate, polystyrene, poly(methyl methacrylate), polyacrylate, polyalkylacrylate, substituted polyalkylacrylate, poly(divinylbenzene), polyvinylpyrrolidone, poly(vinylalcohol), polyacrylamide, poly(ethylene oxide), polyvinylchloride, polyvinylidene fluoride, polytetrafluoroethylene, other halogenated polymers, hydrogels, organogels, chitin, chitosan, random and block copolymers, branched, star and dendritic polymers, and supramolecular polymers.

In other embodiments, the substrate can be conductive metal oxide such as indium tin oxide (ITO), fluorine doped tin oxide (FTO) or doped zinc oxide.

In other embodiments, the substrate can be conductive polymer such as poly(3,4-ethylenedioxythiophene (PEDOT), PEDOT-PSS (polystyrene sulfonate), or a carbon-based conductor (e.g. graphite).

In still other embodiments, the substrate comprises a natural material, for example including at least one of cellulose, natural rubber (e.g., latex), wool, cotton, silk, linen, hemp, flax, and feather fiber.

Extension of the Procedure to Other Geometries

In certain embodiments, the photonic crystal structures described herein can be made into numerous different geometries. For instance, the photonic structure can be made into a film, monolith, powder, bricks, spherical particles, shell, coating, cylinder, rod, and other shapes. The structure can have a dimension (e.g., a length, thickness or radius) of from about 1 μm up to or above 1 cm.

EXAMPLES

Example 1: Titania ($TiO_2$) Inverse Opal Structures

In accordance with certain embodiments, synthetic procedures were designed and optimized specifically to create precursors for the co-assembly of crack-free inverse opals. Previous precursors and attempted precursors either led to unstable suspensions of the assembly solution or cracking of the resulting inverse opal structures (before and/or after the calcination stage). The one-pot procedure described herein synthesizes nanocrystals that, by design, have an amorphous phase intermixed with or adjacent to a crystalline phase, are produced using a minimal number of reagents, and have a desired size and surface charge. Precursors of the present disclosure reduce or eliminate instability of the suspension, and substantially reduce or prevent cracking of the resulting inverse opal structure.

To prepare $TiO_2$ nanocrystals, a magnetic stirrer and 90-mL of deionized (DI) water were added into a 250 mL flask, and the flask was placed in an ice-bath on top of a magnetic stir plate. A certain amount of TMAH solution (generally 1-4 mL of 25% w/w aqueous TMAH solution) was added and the solution was cooled down to ~2° C. 1.1 mL (3.7 mmol) of titanium isopropoxide (TIP) was dissolved in 15 mL of 2-propanol and added dropwise (~1 drop/sec) using a dropping funnel to the vigorously stirred aqueous solution of TMAH. After the addition was complete, the reaction mixture was left to stand for ~10 minutes in an ice-bath and then for ~10 minutes at room temperature. The reaction mixture was then refluxed for 6 hours, cooled, and used without cleaning. This procedure for nanocrystal synthesis is reminiscent of the procedure discussed by Chemseddine and Moritz (*Eur. J. Inorg. Chem*, 1999, 235-245), in which nanoparticles were characterized for their size, shape, and crystallinity using TEM and XRD, however their amorphous nature was not investigated or mentioned.

Figure 3A:
FIGS. 3A-3C are transition electron microscope (TEM) images of as-synthesized titania nanocrystal precursors made with different ratios of titanium precursor, in accordance with certain embodiments.
Figure 3B:
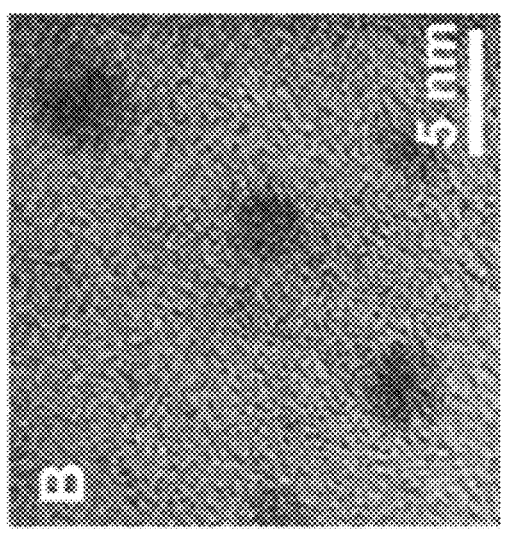
Figure 3C:
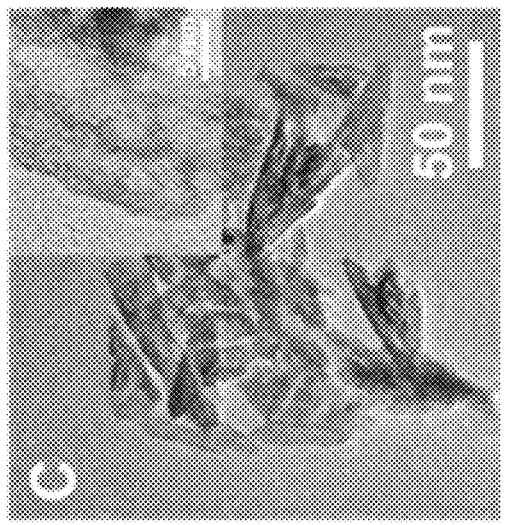
Figures 6A, 6B:
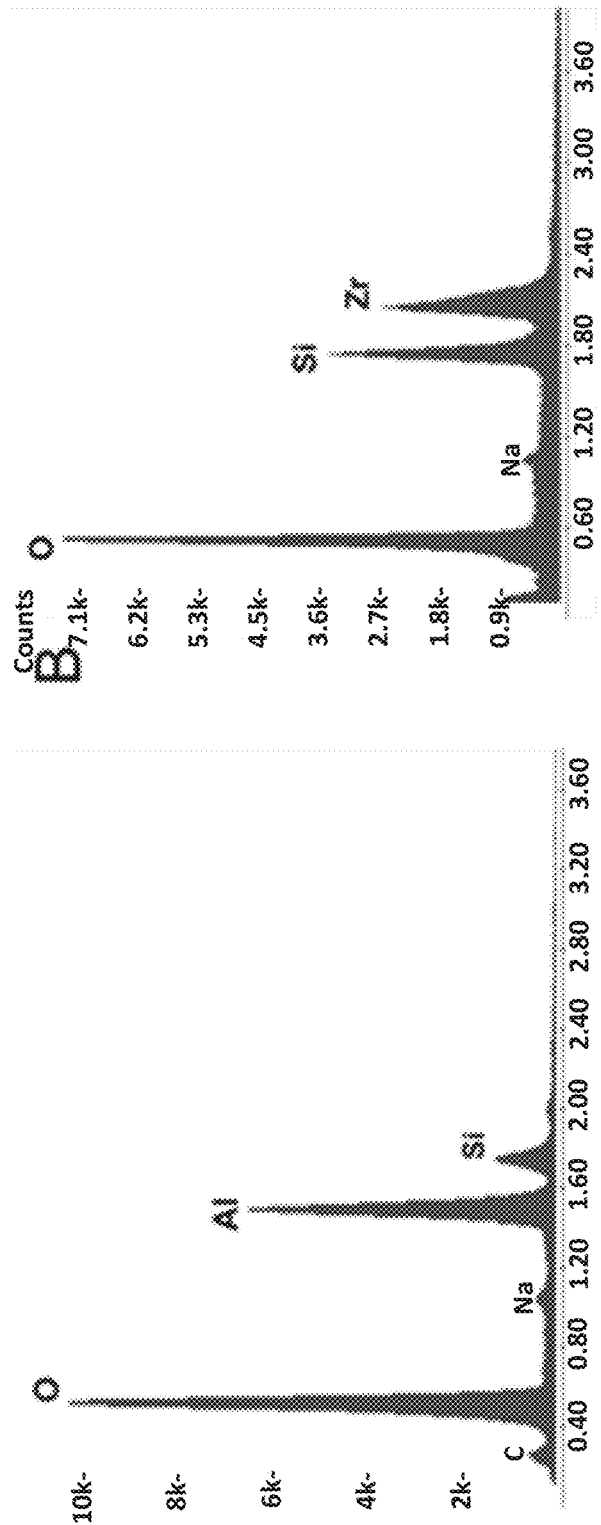
FIG. 6A is an energy dispersive X-ray spectroscopy (EDS) spectra of an alumina inverse opal film, in accordance with certain embodiments.
FIG. 6B is an EDS spectra of a zirconia inverse opal film, in accordance with certain embodiments.

Synthesis of the $TiO_2$ nanocrystals was performed using various molar ratios $R_{TIP/TMAH}$ of TIP/TMAH ($R_{TIP/TMAH}$), including about 0.3, about 0.5, about 1.00, about 1.4, and about 1.9. FIGS. 3A-3C is a series of transmission electron microscopy (TEM) images of $TiO_2$ nanoparticles for TIP/

TMAH ratios $R_{TIP/TMAH}$ Of: (A) $R_{TIP/TMAH}$~0.3; (B) $R_{TIP/TMAH}$~1; (C) $R_{TIP/TMAH}$~2. Both the concentration of TMAH and the aging of the particles affect the NC morphology. Depending on the ratio and aging, titania NC are formed with amorphous material. Lower amounts of TMAH and longer aging times can lead to increased crystallinity and less amorphous material.

To begin fabricating a $TiO_2$ inverse opal film, 100 µL of a 5.1 w % colloidal suspension, 250 µL of $TiO_2$ nanocrystals (e.g., as prepared according to procedure described above in this section), and 5 mL of deionized water were combined in a glass vial. The final solid content of the colloidal particles was 0.10%.

Opals and inverse opals can be assembled or co-assembled via evaporation-induced self-assembly (EISA). EISA is based on the so-called "coffee ring effect," whereby a droplet of colloidal particles or nanoparticles dries with the particles deposited at the edge of the droplet. In EISA, evaporation currents drive colloidal particles to the air-water interface. Above a certain critical colloid concentration, the meniscus shape causes a thin film to grow on a submerged substrate. EISA has been used extensively to grow direct opals. By adding NC's to the assembly solution, titania-polymer compound opals can form. Depending on the ratio ($R_{TIP/TMAH}$) and aging time, crack-free titania inverse opals can form.

Example 1(A): Fabrication of $TiO_2$ Crack-Free Inverse Opal Structures on Silicon Substrates Silicon (Si) wafer substrates (cut to approximately 1 cm×5 cm), were cleaned in piranha solution and then vertically suspended in the glass vial containing the colloid/$TiO_2$ nanoparticle suspension. The water was evaporated over a period of 1-2 days in a 65° C. oven on a pneumatic, vibration-free table to allow the deposition of a compound opal thin film onto the suspended substrate. The compound opal thin films were then calcined at 500° C. for 2 hours, with a 5 hour ramp time, to remove the polymer template and to sinter the $TiO_2$ nanoparticle, thereby forming an inverse opal film on the Si substrate.

FIG. 8A is a SEM image of a $TiO_2$ inverse opal film, made using a $TiO_2$ nanoparticle synthesized with a TIP:TMAH ratio $R_{TIP/TMAH}$ of about 0.5, in accordance with certain embodiments. FIG. 8B is a higher magnification SEM image of the $TiO_2$ inverse opal film of FIG. 8A.

FIG. 8C is a Raman spectrum of a $TiO_2$ inverse opal film, produced via calcination at 500° C., the Raman spectrum indicating an anatase structure. FIG. 8D is an X-ray diffraction (XRD) spectrum of a $TiO_2$ inverse opal film synthesized with a TIP:TMAH ratio $R_{TIP/TMAH}$ of about 0.5, the $TiO_2$ inverse opal film disposed on a silicon substrate after calcination at 500° C., as described above. The XRD spectrum indicates that the inverse opal film has a crystalline structure that is characteristic of anatase $TiO_2$.

As can be seen in FIGS. 8A-8B, cracks are not visible in the inverse opal film fabricated according to methods of the present disclosure—not even at low magnification. For purposes of comparison, $TiO_2$ inverse opals made using nanoparticles that were fabricated using the published synthesis procedure of Chemseddine and Moritz are shown in FIGS. 9A-9C (at varying degrees of magnification). The $TiO_2$ inverse opals of FIGS. 9A-9C have minor cracks, and their microstructure ordering is not optimized. Without wishing to be bound by theory, the inventors attribute this fact to the presence of additional charges and molecules in the as-published procedure due to the high pH, which can disrupt the colloidal assembly. By adjusting the synthesis procedure, the inventors have successfully produced high-quality, crack-free inverse opal assemblies for all investigated molar ratios $R_{TIP/TMAH}$ of TIP/TMAH above about 0.3. According to embodiments described herein, after calcination, the $TiO_2$ of the $TiO_2$ inverse opals is present in the anatase phase, according to both Raman spectroscopy (FIG. 8C) and X-ray diffraction (FIG. 8D). In addition to cracks, the size and crystallinity of the nanoparticles will affect some inverse opal properties; for example, smaller particles will lead to more grain boundaries, which can increase catalytic activity.

Example 1(B): Fabrication of $TiO_2$ Inverse Opal Film on Flexible Substrates Titania has several attractive inherent properties, such as its high RI, (photo)catalytic and electrochromic activities. Titania inverse opals films have promising applications in the field of electrochromic (EC) devices. See, e.g., Hua Li, Guillaume Vienneau, Martin Jones, Balaji Subramanian, Jacques Robichaud and Yahia Djaoued "Crack-free 2D-inverse opal anatase TiO2 films on rigid and flexible transparent conducting substrates: low temperature large area fabrication and electrochromic properties" *J. Mater. Chem. C*, 2014, 2, 7804. Electrochromism can be defined as the ability of a material to undergo color change induced by an external electric field. Current applications of electrochromism include self-darkening rear view mirrors and electrochromic windows. Ordered titania inverse opal films exhibit improved EC performance due to significantly fast switching times and improved coloration contrasts. Titania inverse opals thus combine optical and catalytic properties of the material and structure, in part because the "slow photon" effect enhances photocatalytic activity due to the photonic nature of the structure. Indeed, titania inverse opals have garnered many reports of their photocatalytic activity, but higher quality structures are still necessary to improve the slow photon effect, as well as to enable better fundamental studies into this slow photon enhancement of photocatalysis. For electrochromic devices, an inverse opal architecture of $V_2O_5$, $TiO_2$ and $WO_3$ has recently been reported for its significantly fast switching times and improved coloration contrast. See, e.g., Zhang, J at al. "Energy Dispersive X-ray Spectroscopy Enhanced electrochromic performance of highly ordered, macroporous WO3 arrays electrodeposited using polystyrene colloidal crystals as template" *Electrochimica Acta*, 2013, 99, 1; Li, L. et al. "Improved electrochromic performance in inverse opal vanadium oxide films" *J Mater. Chem.*, 2010, 20, 7131.

Atomic layer deposition (ALD) is conventionally used for the fabrication of large area, crack-free titania inverse opals films on transparent substrates such as indium tin oxide (ITO) coated glass. The post treatment of opals structures at high temperatures that is typically required in order to crystalize the matrix material and to remove the templating colloids limits the choice of substrates to thermally stable ones. This represents a significant drawback, as the development of wireless technologies and modern electronics requires the design of inexpensive, lightweight, and efficient optoelectronic devices such as portable solar cells or EC devices on flexible substrates. Methodologies described herein facilitate fabrication of large-area defect-free and crystalline titania films on transparent flexible conductive substrates using cost efficient and straightforward fabrication method.

Large-area crack-free titania (anatase) IO films were fabricated on ITO coated flexible polyethyleneterephthalate (ITO/PET) substrates using the approach described in the current disclosure. The corresponding SEM images are shown in FIGS. 4A-4B. The compound opal films were fabricated through a co-assembly of titania nanocrystals ($R_{TIP/TMAH}$=1.35) and PS colloids (420 nm) on a pre-treated ITO/PET substrate. As a pre-treatment, the ITO coated plastic substrates were cleaned using an ultrasonic bath for 3 min, successively in acetone, ethanol and deionized water, dried and plasma treated for 1 min. Following formation of the compound opal film, the PS colloids were removed by dissolution in toluene.

Example 2: Alumina ($Al_2O_3$) Inverse Opal Structures

Figure 7B:
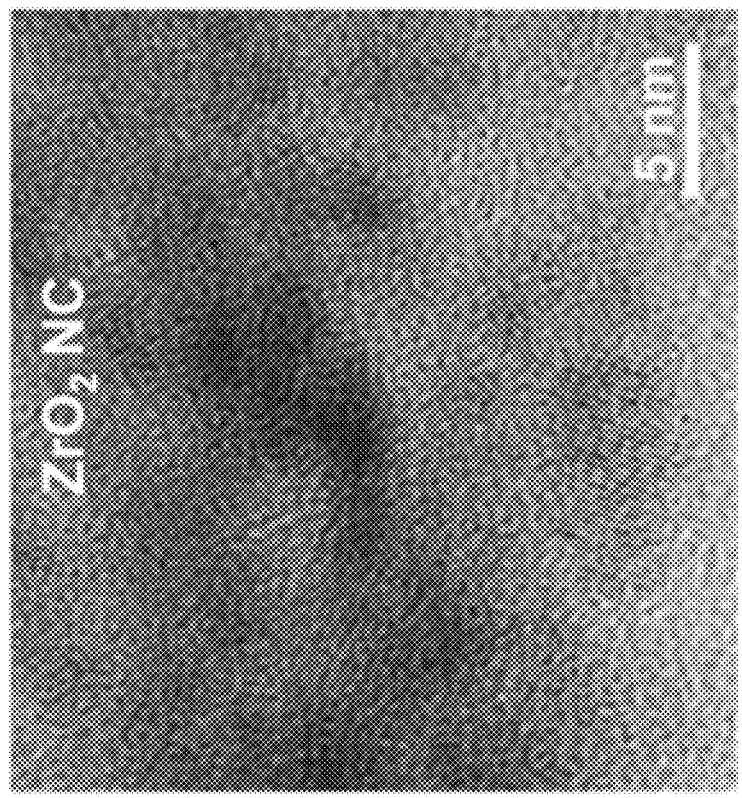
FIG. 7B is a TEM image of zirconium oxide (ZrO$_2$) synthesized with a zirconium 1-propoxide (ZIP):TMAH ratio of about 1.0, in accordance with certain embodiments.
Figure 7A:
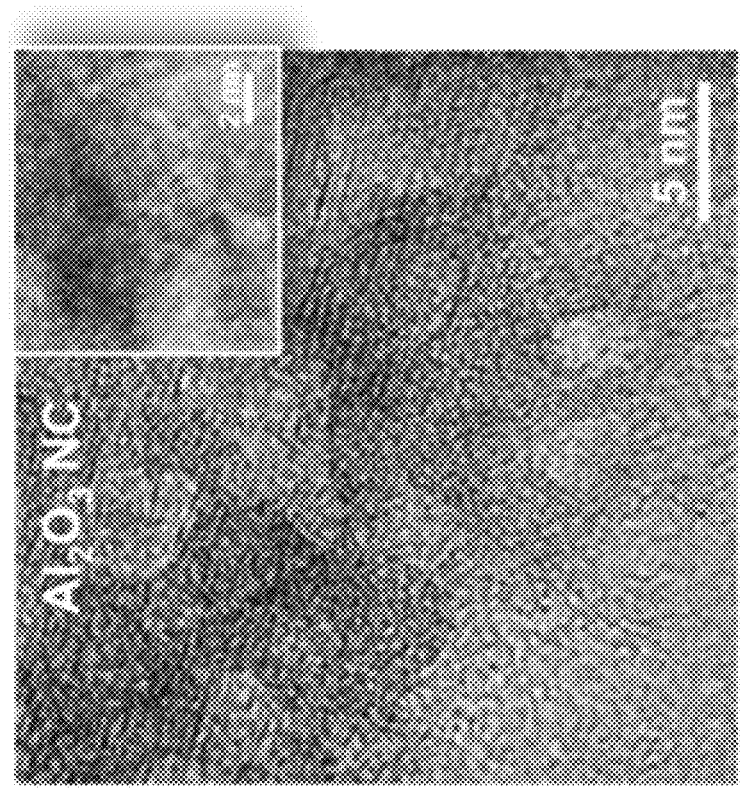
FIG. 7A is a TEM image of aluminum oxide (Al$_2$O$_3$) synthesized with an aluminum isopropoxide (AIP):TMAH ratio $R_{AIP/TMAH}$ of about 0.5, in accordance with certain embodiments. Inset (a) of FIG. 7A shows the crystalline structure of an individual Al$_2$O$_3$ nanocrystal.

Synthesis of $Al_2O_3$ nanoparticles was performed as follows: Aluminum isopropoxide (AIP), a sol-gel precursor, was dissolved in 15 mL of 2-propanol and added dropwise to an aqueous solution of TMAH. The reaction mixture was then refluxed for 48 hours. FIG. 7B is a TEM image of $Al_2O_3$ nanocrystal synthesized with a TIP:TMAH ratio $R_{AIP/TMAH}$ of about 0.5. The inset (a) of FIG. 7B shows the crystalline structure of an individual $Al_2O_3$ nanoparticle.

Figure 10A:
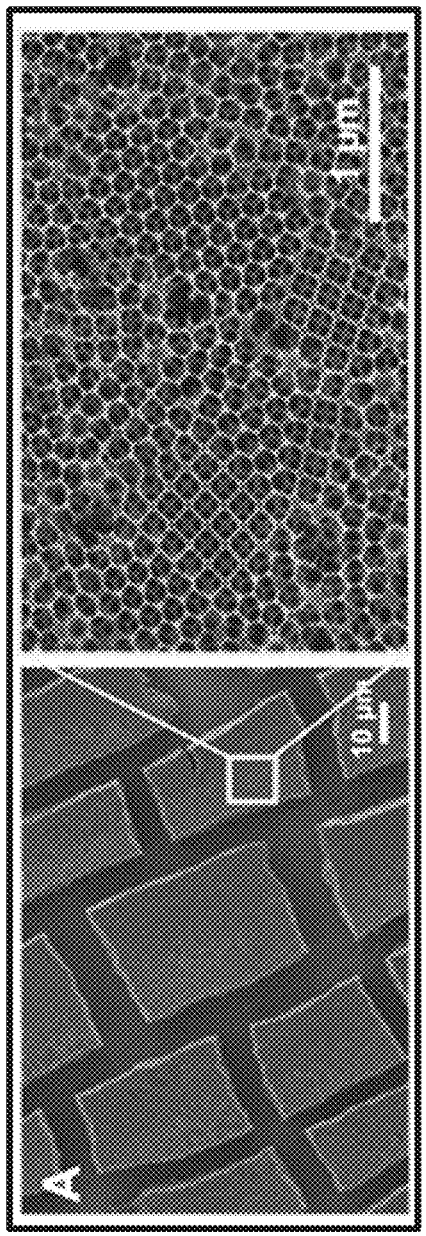
FIG. 10A shows SEM images (with higher magnification on the right) of an Al$_2$O$_3$ inverse opal, synthesized from aluminum isopropoxide—a sol-gel precursor—in accordance with certain embodiments.
Figure 10B:
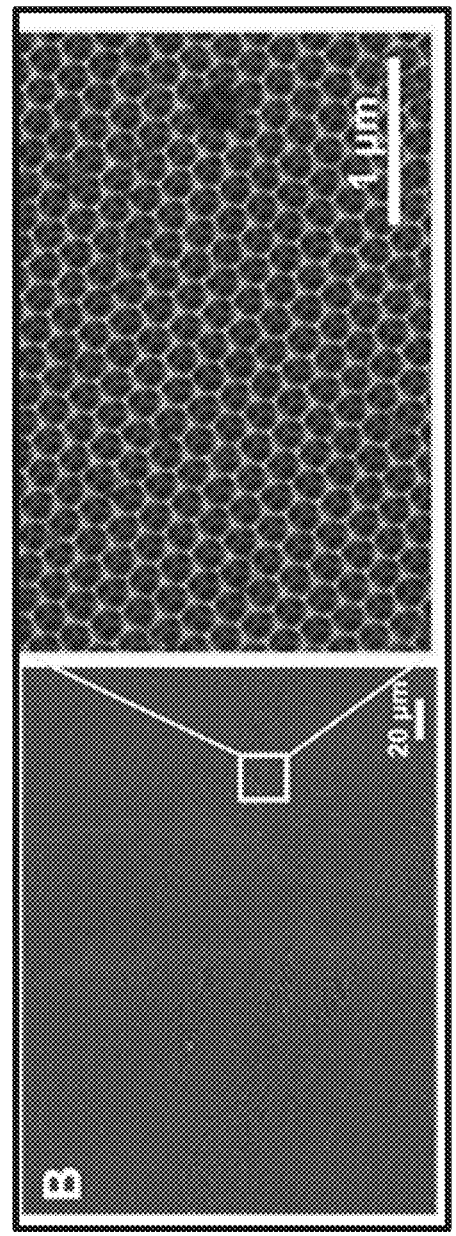
FIG. 10B shows SEM images (with higher magnification on the right) of an Al$_2$O$_3$ inverse opal, synthesized from Al$_2$O$_3$ nanocrystals, the Al$_2$O$_3$ nanocrystals synthesized with an AIP:TMAH ratio $R_{AIP/TMAH}$ of about 0.5, in accordance with certain embodiments.

Synthesis of $Al_2O_3$ inverse opal films was performed using a colloidal dispersion containing 100 μL of a 5.1 w % colloidal suspension, 100 μL of $Al_2O_3$ nanocrystal solution and 5 mL of deionized water. An inverse opal prepared using a standard alumina precursor (aluminum isopropoxide—a sol-gel precursor) is shown in FIG. 10A for reference, and SEM images of $Al_2O_3$ inverse opals assembled from the metal oxide nanocrystal precursors shown in FIG. 7B (with a $R_{AIP/TMAH}$ of about 0.5) are shown in FIG. 10B.

Example 3: Zirconia ($ZrO_2$) Inverse Opal Structures

Synthesis of $ZrO_2$ nanoparticle was performed as follows: zirconium 1-propoxide (ZIP) solution, a sol-gel precursor, was dissolved in 15 mL anhydrous 2-propanol in a glovebox. The solution was subsequently removed and added dropwise to an aqueous solution of TMAH, followed by a 12 hour reflux. FIG. 7C is a TEM image of $ZrO_2$ nanoparticle synthesized with a ZIP:TMAH ratio $R_{ZIP/TMAH}$ of about 1.0.

Synthesis of $ZrO_2$ inverse opal films was performed using a colloidal dispersion containing 100 μL of a 5.1 w % colloidal suspension, 400 μL of $ZrO_2$ nanoparticle and 4.5 mL of deionized water. FIGS. 11A-11B are SEM images (at varying magnifications) of a $ZrO_2$ inverse opal film, synthesized as outlined above, where the $ZrO_2$ nanoparticle were synthesized with a ZIP:TMAH ratio $R_{ZIP/TMAH}$ of about 1.0 (i.e., the nanoparticle precursor shown in FIG. 7C).

Figure 15C:
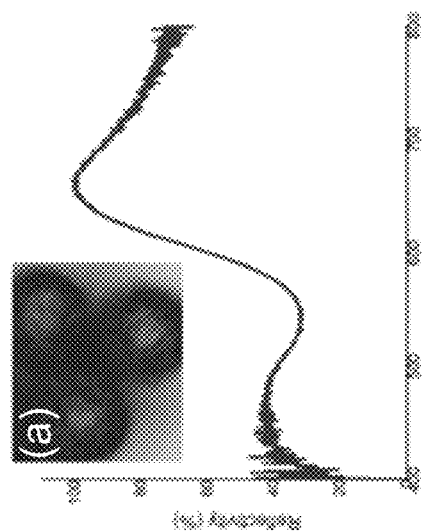
FIG. 15C is a reflection spectrum acquired from a single photonic particle, where inset (a) shows an optical image of the particles of FIG. 15A, in accordance with certain embodiments.
Figure 15B:
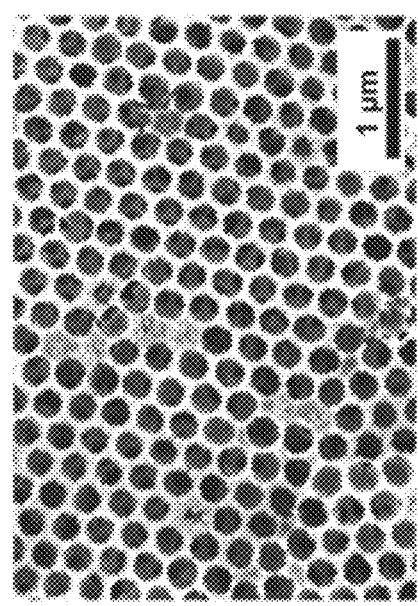
FIG. 15B is a SEM image of a fragment of a single photonic particle of the spherical $TiO_2$ inverse opal microparticles of FIG. 15A, in accordance with certain embodiments.
Figure 15A:
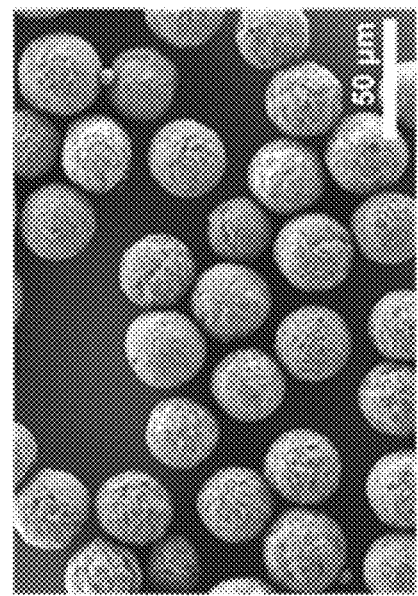
FIG. 15A is a SEM image of spherical TiO$_2$ inverse opal microparticles formed using 420 nanometer (nm) polystyrene (PS) colloids of highly uniform size, as characterized by a polydispersity index (PDI) of 5%, in accordance with certain embodiments.

Example 4: Incorporation of Gold Nanoparticles into Titania Inverse Opals Through 3-Phase Co-Assembly Gold nanoparticles (Au NP) were incorporated into inverse opal films (shown in FIG. 14A and further magnified in FIG. 14B), bricks, and balls (shown in FIG. 15A and further magnified in FIG. 15B) by adding a polyethylene glycol (PEG)-modified Au NP solution (to a final weight percent of 0.1 to 5 w %) into a co-assembly precursor solution comprising an aqueous solution of polymer (420 nm polystyrene (PS)) colloids with a polydispersity index (PDI) of <5% and $TiO_2$ NCs. Water was added to achieve the desired overall precursor concentrations described above for films, bricks, and photonic balls. Incorporation of Au NP intensifies the red appearance (shown as the lighter central regions of the nanoparticles shown in the grayscale image of FIG. 15C) of the photonic structure through selective absorption of undesired reflections. Exemplary effects on the optical spectra are shown for photonic balls in the reflection spectrum, acquired from a single photonic particle, of FIG. 15C. The photonic peak at ~680 nm is enhanced by the Au NP absorption (~550 nm). Inset (a) shows an optical image of the particles of FIG. 15A.

Example 5: Incorporation of Gold, Platinum, and Palladium Nanoparticles into Titania Inverse Opals Through 2-Phase Co-Assembly Using Raspberry Particles The inventors have previously reported on decorated particles (WO 2014/210608). Decorated particles, or "raspberry-shaped particles," are composite metal-polymer colloidal particles comprising metal nanoparticles that are covalently bound to a chemically modified surface of polystyrene (PS) colloids, with homogeneous metal nanocrystals distribution at the pore surface. FIGS. 16A-16C are TEM images of raspberry particles formed with a PS colloid modified with: 5 nm Au nanocrystals, 7 nm platinum (Pt) nanoparticles, and 10 nm palladium (Pd) nanoparticles, respectively. These composite PS—metal nanoparticles colloids can be employed as template particles in the assembly of inverse opal scaffolds. Inverse opals can be assembled using a protocol similar to the co-assembly of $TiO_2$ inverse opals described herein, but with raspberry-shaped particles substituted for the unfunctionalized PS colloids. A colloidal suspension of raspberry-shaped particles was mixed with 250 μL of $TiO_2$ nanocrystal solution and deionized water to achieve a 0.1% final solid content of the colloidal suspension. Si wafer substrates (cut to approximately 1 cm×5 cm), cleaned in piranha solution, were vertically suspended in a vial containing the raspberry particles/$TiO_2$ nanoparticle suspension. The water was evaporated over a period of 1-2 days in a 65° C. oven on a pneumatic vibration-free table, to allow the deposition of a thin film onto the suspended substrate. The compound opal films were then calcined at 500° C. for 2 hours, with a 5 hour ramp time, to remove the polymer template and to sinter the $TiO_2$ NC. SEM images of exemplary inverse opal structures with incorporated metal nanoparticles are shown in FIGS. 16D-16F (where the metal nanoparticles is Au, Pt and Pd, respectively).

In some embodiments, the metal nanoparticle incorporation method described above yields composite inverse opals with metal nanoparticles found exclusively at the air/metal oxide (e.g., $TiO_2$) interface of the inverse opal matrix. In such configurations, each metal nanoparticle is accessible/exposed to chemical reagents or analytes that are introduced into the scaffold via liquid or gas phase, which is advantageous for applications such as catalysis and surface-enhanced Raman scattering (SERS). In addition, the confinement of plasmonic nanoparticles (e.g., Au NP) to the surface of the inverse opal scaffold induces a controlled spectral modification of the inverse opal reflection, making this material a versatile platform for photonic/plasmonic colorimetric sensing and effect pigmentation with angle-independent coloration resulting from the metal nanoparticles absorption and iridescence imparted by the inverse opal's nanoscale periodicity.

Example 6: Photonic Crystal Bricks

Figures 12A, 12B:
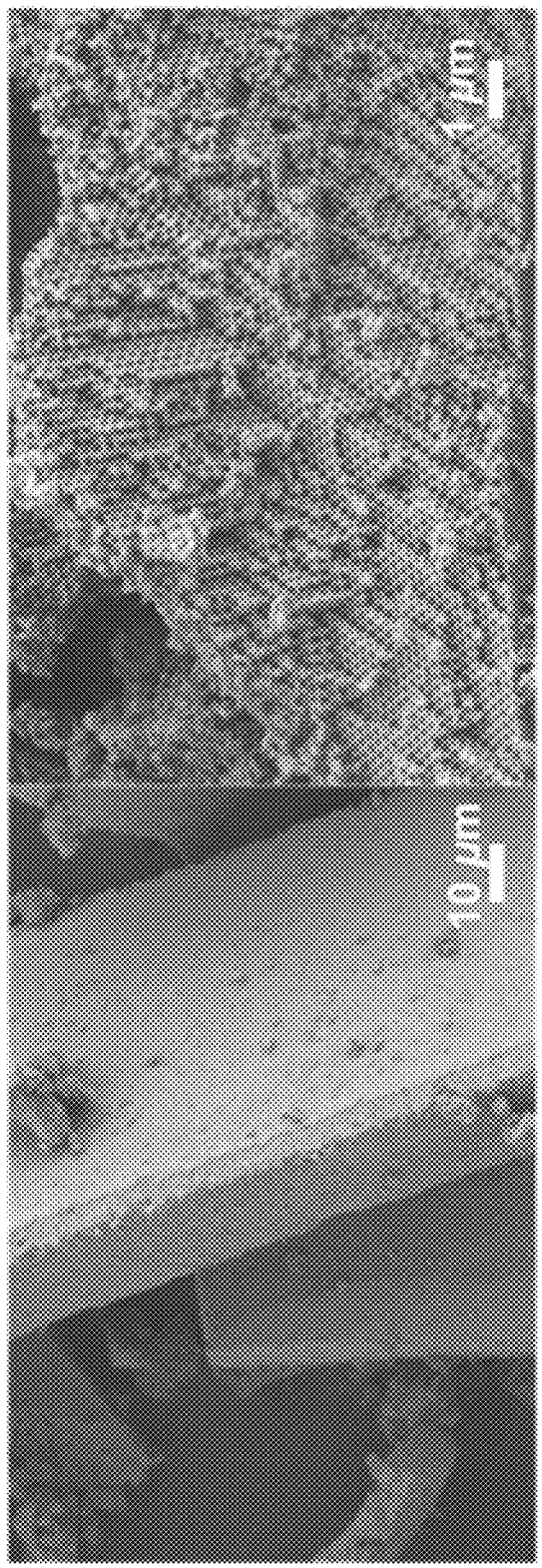
FIG. 12A is a SEM image of a TiO$_2$ inverse opal photonic brick, in accordance with certain embodiments.
FIG. 12B is a higher magnification SEM image of the TiO$_2$ inverse opal photonic brick of FIG. 12A, zoomed in on the edge of an individual photonic crystal particle.

Assembly of TiO$_2$ inverse opal photonic bricks, or "freeform" photonic bricks were grown on the inner walls of 20 mL glass vials containing co-assembly solution. The thickness of the photonic bricks was tunable by adjusting the concentration of the precursor solution. For example, in one implementation, 300 μL of a 5.1 w % colloidal suspension, 750 μL of TiO$_2$ nanoparticles and 5 mL of deionized water were combined in a glass vial. The final solid content of the colloidal suspension was 0.3%. The solvent content of the colloidal suspension was evaporated over a period of 1-2 days in a 65° C. oven on a pneumatic vibration-free table, to allow the deposition of a film onto the inner walls of the vial. In this colloidal concentration regime, the formation of photonic bricks occurs spontaneously due to natural cracking of the film deposited on the wall, thereby facilitating particulate release for collection during calcination (e.g., at 500° C.) and sintering. An SEM image of "freeform" TiO$_2$ opal photonic bricks is shown in FIG. 12A, and a higher magnification SEM image of the TiO$_2$ inverse opal photonic brick of FIG. 12A, zoomed in on the edge of an individual photonic crystal particle.

Example 7: Photonic Crystal Balls

Figures 13A, 13B, 13C, 13D:
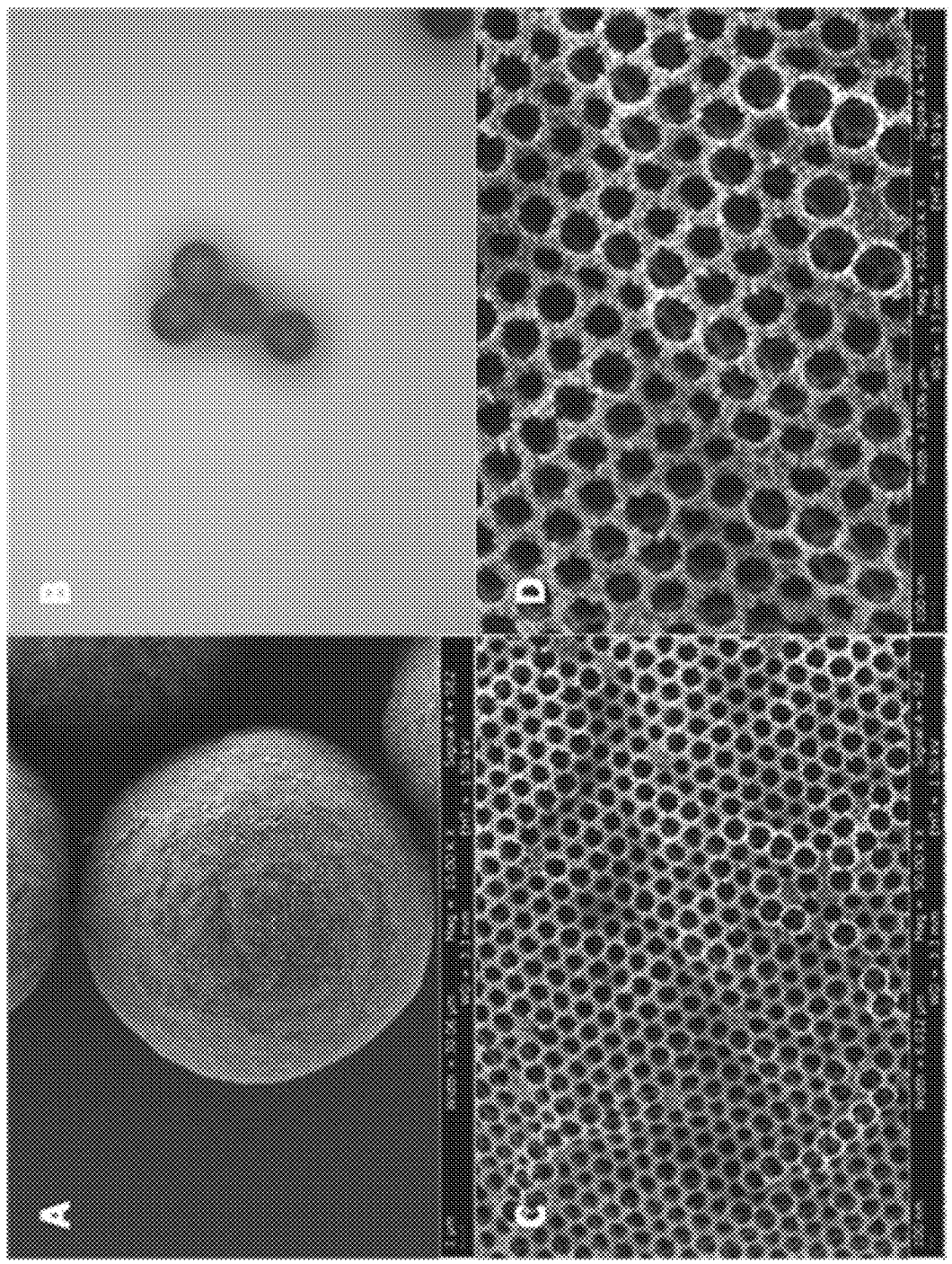
FIG. 13A is a SEM image of a TiO$_2$ inverse opal spherical microparticle, in accordance with certain embodiments.
FIG. 13B is an optical microscope image of the same microparticles shown in FIG. 13A. Each microparticle is ~17 μm in diameter.
FIG. 13C is a SEM image of the TiO$_2$ inverse opal spherical microparticle of FIG. 13A, taken at a higher magnification than in FIG. 13A, in accordance with certain embodiments.
FIG. 13D is a SEM image of the TiO$_2$ inverse opal spherical microparticle of FIG. 13A, taken at a higher magnification than in FIG. 13C, in accordance with certain embodiments.

The formation of spherical inverse opal particles, or "photonic balls," in accordance with the present disclosure was performed as follows: An aqueous solution containing ~0.5 wt-% of polystyrene colloids (256 nm, PDI~5%) and ~0.7 wt-% of TiO$_2$ nanoparticles was emulsified using a t-junction microfluidic device with 150 μm channel width. The continuous phase contained 0.5 wt-% of a surfactant in Novec 7500 (3M). Upon evaporation of water from the droplets, the resulting spherical microparticles were calcined at 600° C. for two hours. SEM images of the resulting TiO$_2$ inverse opal spherical microparticles are shown in FIGS. 13A and 13C-13D (at varying magnification), and an optical microscope image of the TiO$_2$ inverse opal spherical microparticles is shown in FIG. 13B. The TiO$_2$ inverse opal spherical microparticles have an iridescent appearance that is dominated by a blue color, when white light is reflected in a specular configuration. Further details concerning photonic balls can be found in U.S. Patent Application Publication Number 2014/0254017.

In the foregoing examples, the final solid content of the suspension prior to calcining is typically about 1-10 w % initially for photonic balls, about 0.1 w % for films, and about 0.3 w % for shards. In each case, the water or other solvent component of the suspension evaporates over time, and therefore the solid content can increase over time.

Applications

Figure 17:
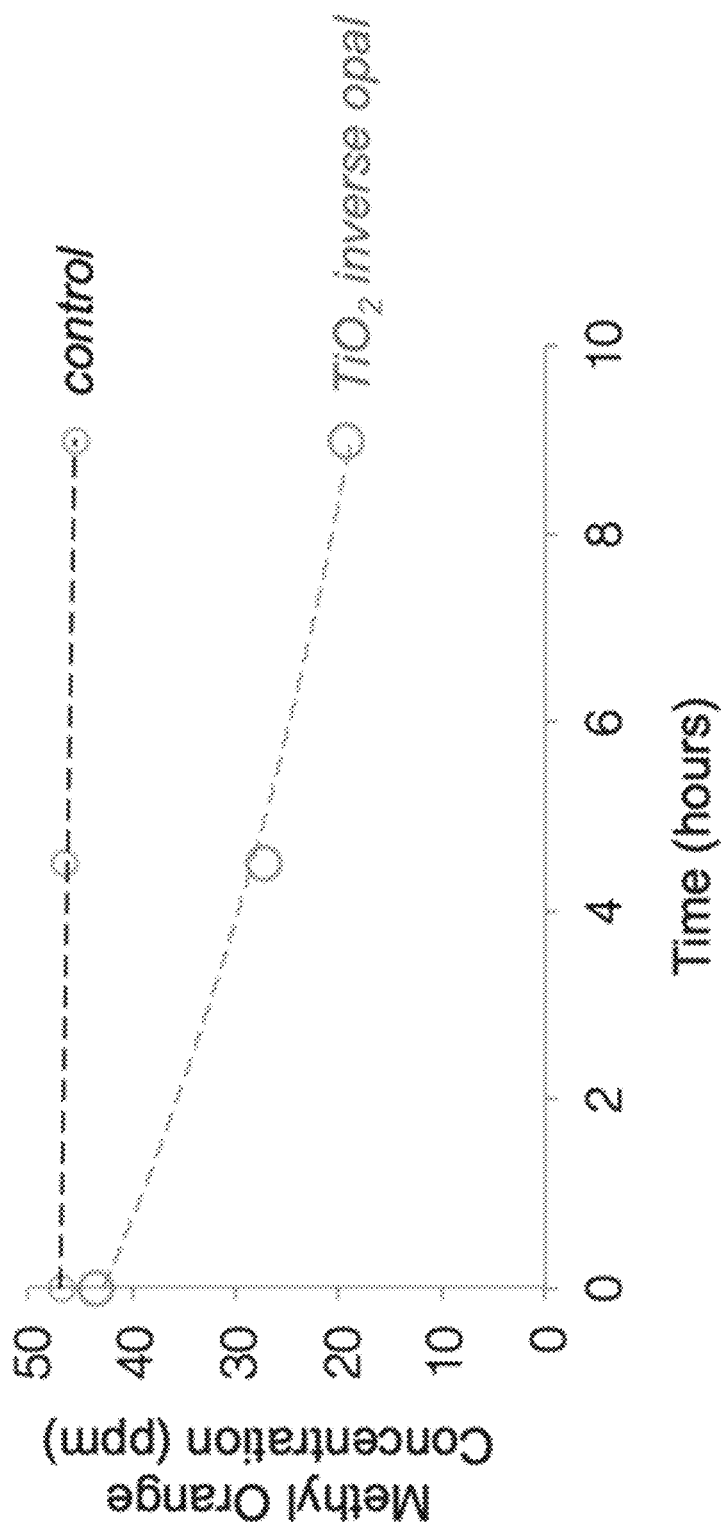
FIG. 17 is a plot of methyl orange concentration (in ppm) versus time, showing catalytic degradation of methyl orange by a $TiO_2$ inverse opal upon exposure to ultraviolet (UV) light, in accordance with certain embodiments.

Inverse opals made according to certain embodiments herein can enable and/or enhance a variety of applications. For example, in catalysis, TiO$_2$ is known to oxidize organic molecules upon irradiation with UV light. These TiO$_2$ inverse opals were tested for their photocatalytic activity using methyl orange as a test molecule. The concentration of methyl orange in solution was monitored with UV-vis spectroscopy. FIG. 17 is a plot of methyl orange concentration (in ppm) versus time, showing catalytic degradation of methyl orange by a TiO$_2$ inverse opal upon exposure to ultraviolet (UV) light.

TiO$_2$, Al$_2$O$_3$, ZrO$_2$, and other metal oxide inverse opal films, powders and microparticles described herein combine the benefits of the inverse opal structure (including both periodicity and porosity) with the chemical and physical properties of the oxides and their mixtures (including refractive index, absorption properties, catalytic activity, electroactivity, or strength). Metal oxide inverse opals of the present disclosure can be useful for applications such as:

- structural color dyes in paint formulations (with the ability to retain color in solutions)
- structural color dyes in cosmetic products, with additional functionality such as antimicrobial or sunscreen properties
- heterogeneous/dispersive catalytic substrates or supports
- solar cells and fuel cells (with the metal oxide as the active or support medium)
- other electrode uses, such as photoelectrochemical cells, capacitors, and batteries
- sensing substrates, for example in colorimetric indicators or for Raman enhancement
- drug loading and release vehicles
- filters and membranes, for separation or air filtration
- photonic applications, such as lasing and waveguiding
- other optical applications, such as smart displays or other electrochromic materials
- substrates for microelectronics applications
- coatings for cooling devices For example, the catalytic activity of titania inverse opals is demonstrated in FIG. 17. Titania inverse opal particles in accordance with some embodiments is shown to catalyze the degradation of methyl orange under UV light.

As another example, the color retention performance of titania inverse opal-based paint is compared with that of silica inverse opal paint in FIGS. 18A-18F. FIG. 18A is an optical image of a silica-based inverse opal (IO) paint when dry, in accordance with some embodiments. FIG. 18B is an image of the silica-based IO paint of FIG. 18A, when wet, in accordance with some embodiments. FIG. 18C is a plot of the % reflectance for both the dry silica-based IO paint of FIG. 18A, and for the wet silica-based IO paint of FIG. 18B.

FIG. 18D is an optical image of a titania-based inverse opal (IO) paint when dry, in accordance with some embodiments. FIG. 18E is an image of the titania-based IO paint of FIG. 18D, when wet, in accordance with some embodiments. FIG. 18F is a plot of the % reflectance for both the dry titania-based IO paint of FIG. 18D, and for the wet titania-based IO paint of FIG. 18E.

Embodiments described herein, comprising the formation of high-quality structures through coassembly within droplets, can be used for direct printing of TiO$_2$ photonic structures using inkjet printing technology.

As used herein, the terms "about" and "approximately" generally mean plus or minus 10% of the value stated, e.g., a value of about 250 would include 225 to 275, and about 1,000 would include 900 to 1,100.

Upon review of the description and embodiments provided herein, those skilled in the art will understand that modifications and equivalent substitutions may be performed in carrying out the invention without departing from the essence of the invention. Thus, the invention is not meant to be limiting by the embodiments described explicitly above.

What is claimed is:

1. An inverse photonic structure comprising
   a first component comprising air holes or colloidal particles;
   and a metal oxide matrix comprising metal oxide nanocrystals, wherein the metal oxide nanocrystals comprise at least one of: a transition metal, titania, zirconia, alumina, iron oxide, zinc oxide, tin oxide, beryllia, a noble metal oxide, platinum group metal oxides, hafnia, molybdenum oxide, tungsten oxide, rhenium oxide, tantalum oxide, niobium oxide, vanadium oxide, chromium oxide, scandium oxide, yttria, lanthanum oxide, ceria, a rare earth oxide, thorium oxide, uranium oxide, other rare earth oxides, or a combination thereof wherein the inverse photonics structure is crack-free for at least 10,000 repeat units of the first component.

2. The inverse photonic structure of claim 1, wherein the metal oxide matrix comprises a transition metal.

3. The inverse photonic structure of claim 1, wherein the metal oxide matrix is selected from a group consisting of titania, alumina, and zirconia.

4. The inverse photonic structure of claim 1, wherein the metal oxide matrix comprises titania.

5. The inverse photonic structure of claim 1, wherein the first component comprises air holes.

6. The inverse photonic structure of claim 1, wherein the first component comprises air holes having diameters of 100 nm to 1000 nm.

7. The inverse photonic structure of claim 5, wherein the inverse photonic structure includes nanoparticles at the interface of the metal oxide matrix and the air holes.

8. The inverse photonic structure of claim 7, wherein the nanoparticles are selected from a group consisting of metal nanoparticles, semiconductor nanoparticles, metal oxide nanoparticles, metal sulfide nanoparticles, and combinations thereof.

9. The inverse photonic structure of claim 1, wherein the first component comprises colloidal particles.

10. The inverse photonic structure of claim 9, wherein the colloidal particles comprise a material selected from the group consisting of metals, semiconductor materials, oxide, sulfide, organometallic complexes, organic materials, polymers, natural materials, and combinations thereof.

11. The inverse photonic structure of claim 9, wherein the colloidal particles have diameters of 100 nm to 1000 nm.

12. The inverse photonic structure of claim 9, wherein the colloidal particles are decorated with nanoparticles.

13. The inverse photonic structure of claim 12, wherein the nanoparticles are selected from a group consisting of metal nanoparticles, semiconductor nanoparticles, metal oxide nanoparticles, metal sulfide nanoparticles, and combinations thereof.

14. The inverse photonic structure of claim 1, wherein the metal oxide incorporates functional particles.

15. The inverse photonics structure of claim 14, wherein the functional particles are selected from a group consisting of metal nanoparticles, semiconductor nanoparticles, metal oxide nanoparticles, metal sulfide nanoparticles, and combinations thereof.

16. The inverse photonic structure of claim 1, wherein the inverse photonic structure is an inverse opal structure.

17. The inverse photonic structure of claim 1, wherein the inverse photonic structure is a thin film deposited onto a surface.

18. The inverse photonic structure of claim 1, wherein the inverse photonic structure is formed as one of a film, a brick, a spherical particle, or a particle of a complex shape.

* * * * *